United States Patent
Asai et al.

(10) Patent No.: US 9,443,178 B2
(45) Date of Patent: Sep. 13, 2016

(54) IMAGE PROCESSING APPARATUS, NON-TRANSITORY COMPUTER READABLE MEDIUM, AND IMAGE PROCESSING METHOD FOR DETERMINING WHETHER A PRINT JOB IS RECOVERABLE

(71) Applicant: FUJI XEROX CO., LTD., Tokyo (JP)

(72) Inventors: Katsuyuki Asai, Kanagawa (JP); Toshiaki Yoshinari, Kanagawa (JP); Bo Liu, Kanagawa (JP); Takuya Mizuguchi, Kanagawa (JP); Toshio Kamada, Kanagawa (JP); Kentaro Ikeda, Kanagawa (JP); Kazuki Nagashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/641,857

(22) Filed: Mar. 9, 2015

(65) Prior Publication Data

US 2016/0004943 A1 Jan. 7, 2016

(30) Foreign Application Priority Data

Jul. 2, 2014 (JP) ................. 2014-136854

(51) Int. Cl.
*G06F 3/12* (2006.01)
*G06K 15/00* (2006.01)
*G06K 15/02* (2006.01)
*H04N 1/00* (2006.01)

(52) U.S. Cl.
CPC ......... *G06K 15/408* (2013.01); *G06K 15/1803* (2013.01); *H04N 1/00* (2013.01)

(58) Field of Classification Search
CPC . G06K 15/408; G06K 15/1803; B41J 29/38; B41J 29/46; G06F 3/121; G06F 3/1234; G06F 3/1285; H04N 1/00; H04N 1/32

USPC ...... 358/1.1, 1.9, 1.13, 1.14, 1.15, 1.18, 474
See application file for complete search history.

(56) References Cited

U.S. PATENT DOCUMENTS

| | | | |
|---|---|---|---|
| 7,110,917 B2* | 9/2006 | Matsuura | G06F 11/008 358/1.14 |
| 2007/0057978 A1* | 3/2007 | Hagiwara | G06K 15/02 347/5 |
| 2011/0075193 A1* | 3/2011 | Kumamoto | B41F 33/0036 358/1.15 |
| 2012/0218587 A1* | 8/2012 | Koike | G06F 3/1234 358/1.14 |
| 2012/0288311 A1* | 11/2012 | Hosoda | G03G 15/6547 399/408 |
| 2015/0022845 A1* | 1/2015 | Roscoe | G06K 15/408 358/1.14 |

FOREIGN PATENT DOCUMENTS

| | | |
|---|---|---|
| JP | 2004-338308 A | 12/2004 |
| JP | 2013-123813 A | 6/2013 |

* cited by examiner

*Primary Examiner* — Gabriel Garcia
(74) *Attorney, Agent, or Firm* — Sughrue Mion, PLLC

(57) ABSTRACT

An image processing apparatus includes a detection unit and a determination unit. The detection unit detects an error by comparing image data related to a print job with read image data obtained as a result of reading a print output related to the print job. The determination unit compares read image data related to a post-error print output, which is a continuously-printed print output related to the print job for a page subsequent to a page in which the error is detected, with the image data when the error is detected by the detection unit, so as to determine a process for recovering the print job by using the post-error print output.

9 Claims, 21 Drawing Sheets

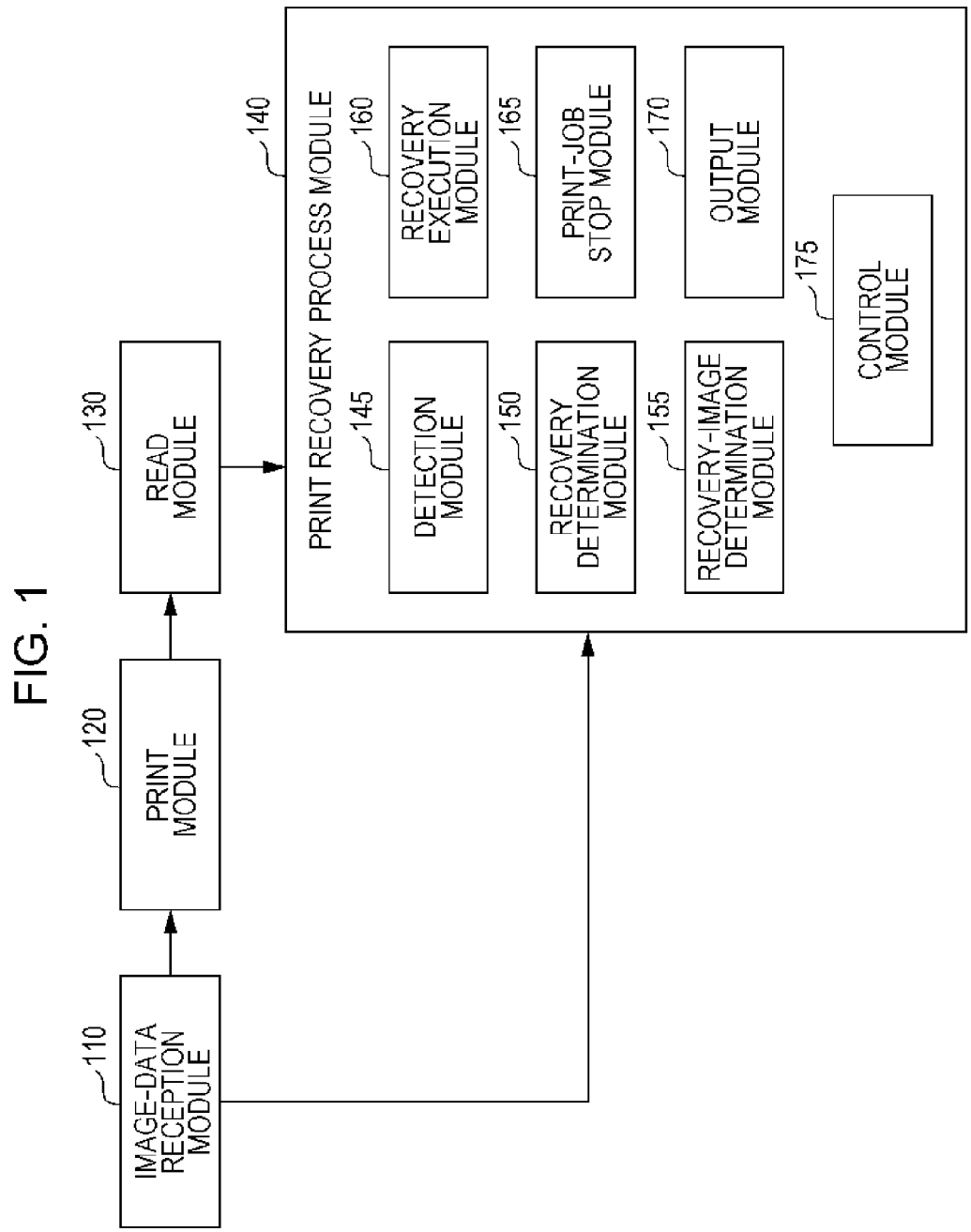

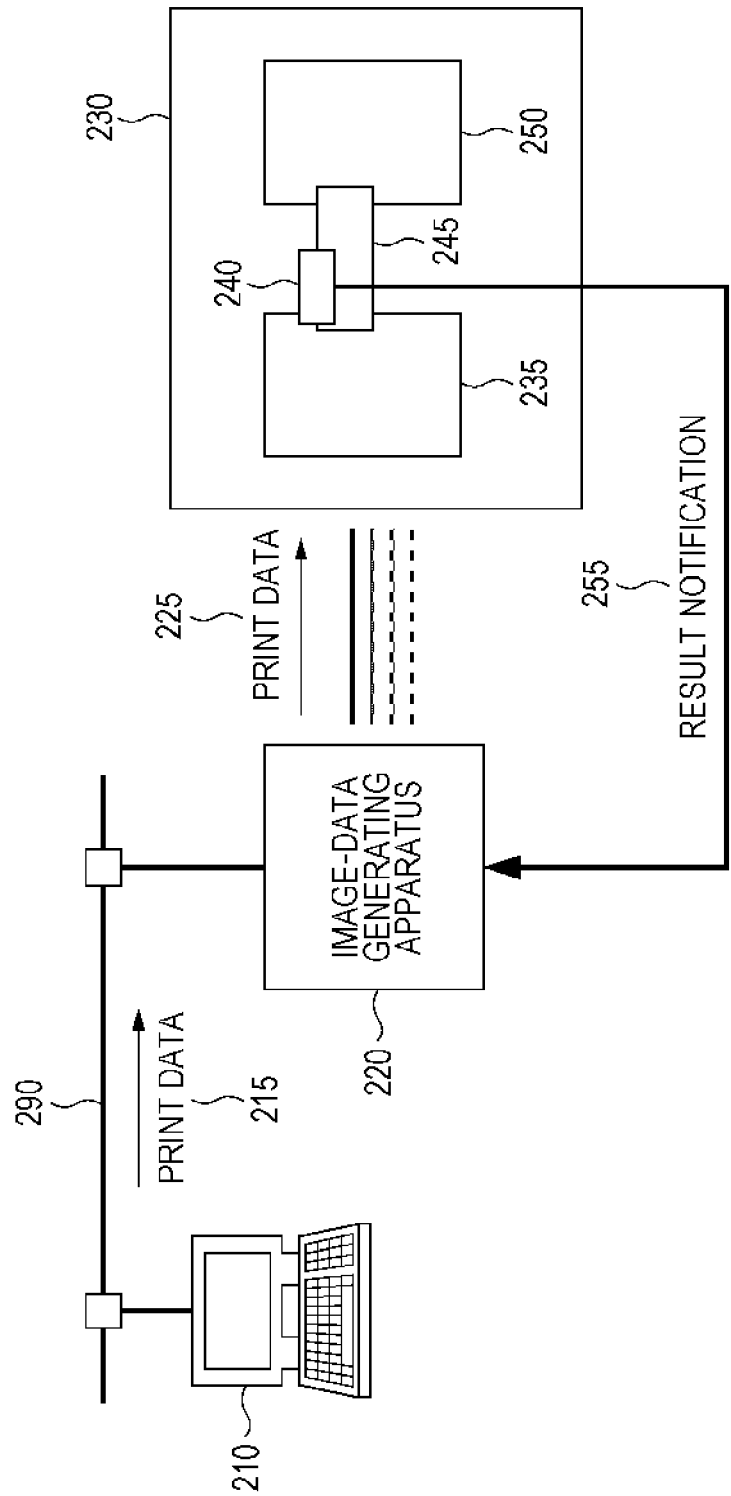

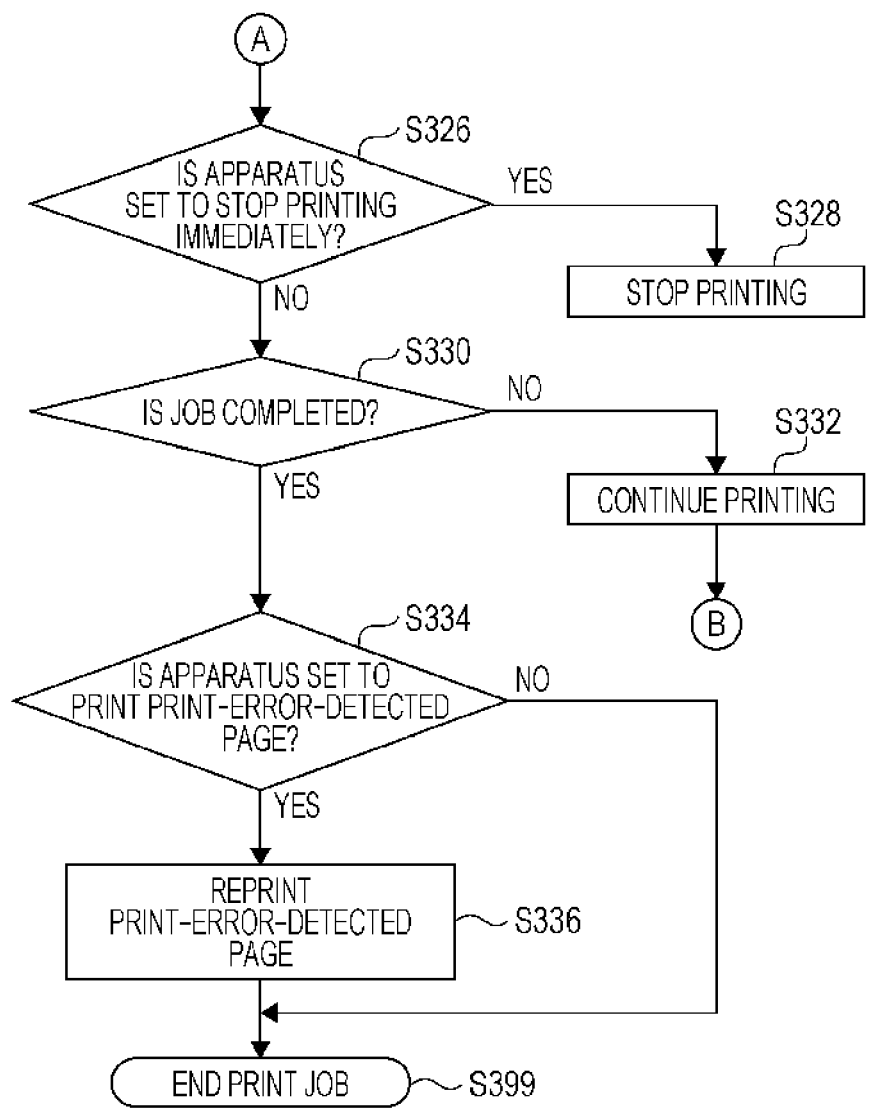

FIG. 4
ERROR PATTERN (1): BLANK-SHEET ERROR NOTIFICATION
(YES IN STEP S308)
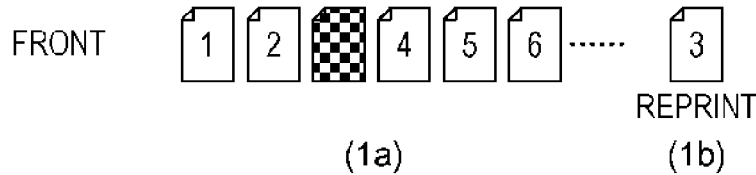
(1a)  (1b)
ERROR PATTERN (2): INTERMITTENT ERROR NOTIFICATION
(YES IN STEP S312)
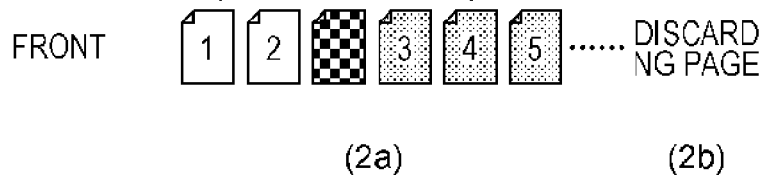
(2a)  (2b)
ERROR PATTERN (3): MISSING-PAGE ERROR NOTIFICATION
(YES IN STEP S316)
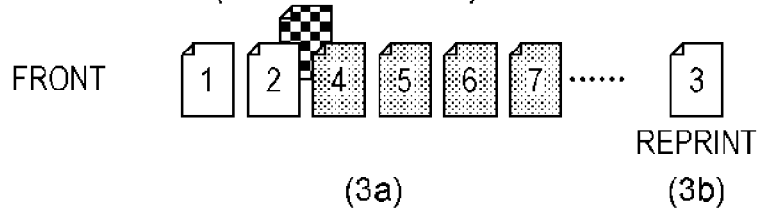
(3a)  (3b)
ERROR PATTERN (4): INTERCHANGED-PAGE ERROR NOTIFICATION
(YES IN STEP S320)
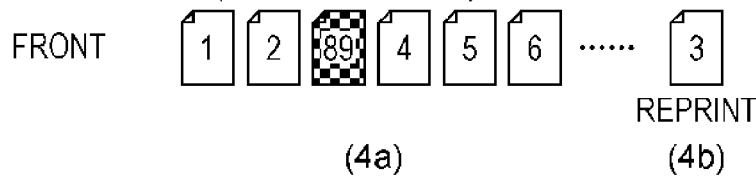
(4a)  (4b)
ERROR PATTERN (5): MISCELLANEOUS ERROR NOTIFICATION
(SUCH AS IMAGE DISTORTION) (NO IN STEP S320)
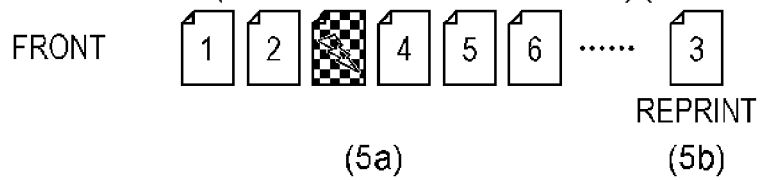
(5a)  (5b)

FIG. 5A
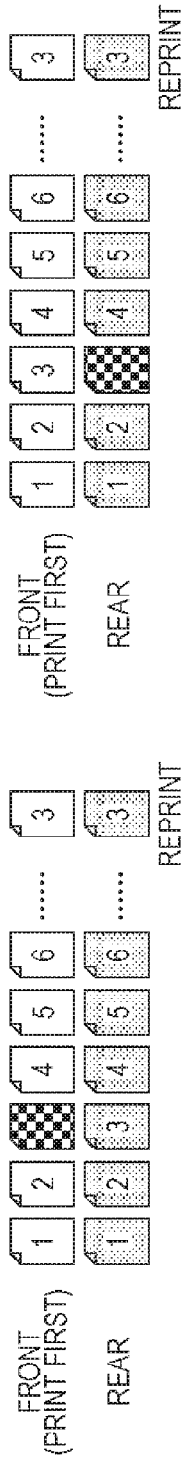
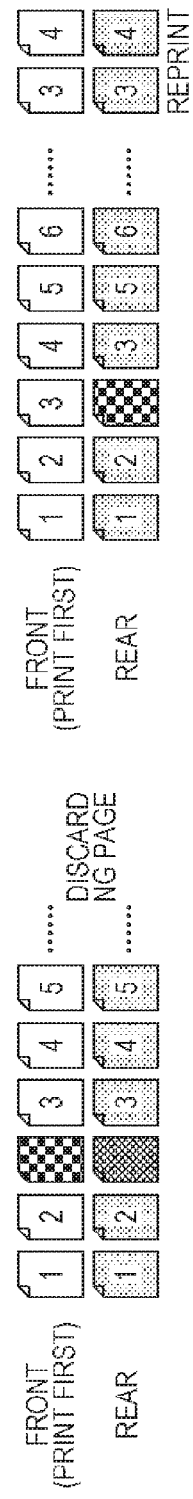
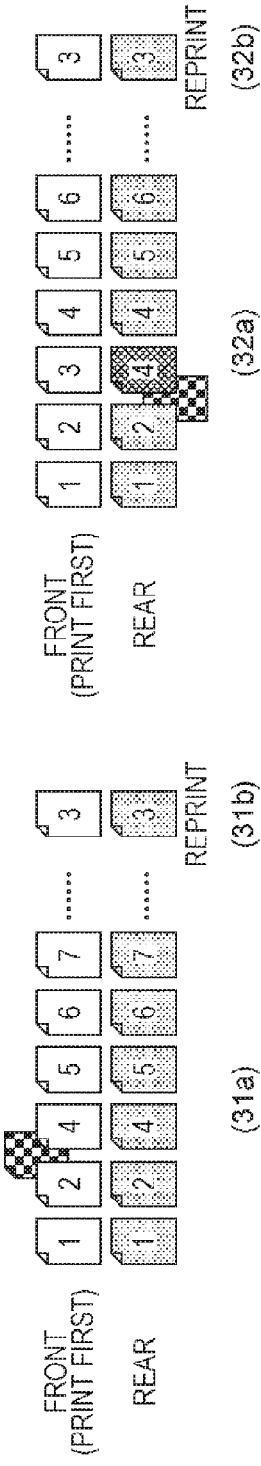

FIG. 5B
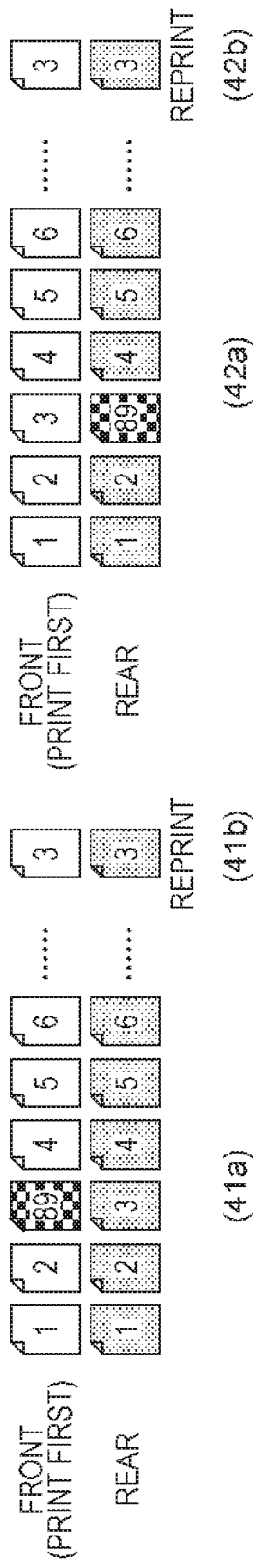
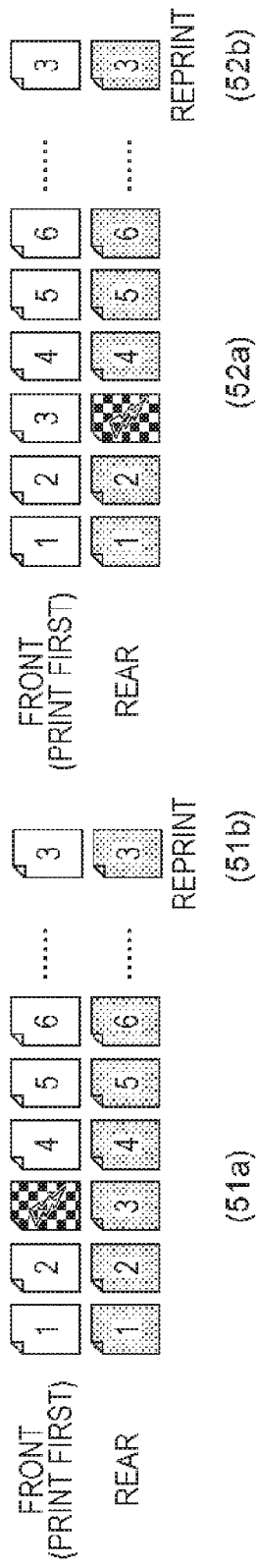

| 810 | | | | | 820 | | | | | 830 | | | |
|---|---|---|---|---|---|---|---|---|---|---|---|---|---|
| 1 | 3 | 5 | 7 | | 9 | 11 | 13 | 15 | | 17 | 19 | 21 | 23 |
| 2 | 4 | 6 | 8 | | 10 | 12 | 14 | 16 | | 18 | 20 | 22 | 24 |

ERROR PATTERN (11): BLANK-SHEET
THIRD PAGE         ERROR NOTIFICATION
IS BLANK

| 1 | ▨ | 5 | 7 | 9 | 11 | 13 | 15 | 17 | 19 | 21 | 23 |
|---|---|---|---|---|----|----|----|----|----|----|----|
| 2 | 4 | 6 | 8 | 10| 12 | 14 | 16 | 18 | 20 | 22 | 24 |

| 1 | 3 | 5 | 7 |
|---|---|---|---|
| 2 | 4 | 6 | 8 |

REPRINT (1a)                    (1b)

⎫ REPRINT ALL REGARDLESS
⎬ OF TYPE OF ERROR

ERROR PATTERN (12): INTERMITTENT
                    ERROR NOTIFICATION
RESET LEADING  RECOVER
PAGE FOR       HERE IF
RECOVERY       TOO LATE
   ⇩ ~922        ⇩ ~924

| 1 | ▨ | 4 | 6 | 9 | 11 | 13 | 15 | 17 | 19 | 21 | 23 |
|---|---|---|---|---|----|----|----|----|----|----|----|
| 2 | 3 | 5 | 7 | 10| 12 | 14 | 16 | 18 | 20 | 22 | 24 |

| 1 | 3 | 5 | 7 |
|---|---|---|---|
| 2 | 4 | 6 | 8 |

REPRINT (2a)                    (2b)

SUBSEQUENT PAGES ARE
ALL NG UNLESS LEADING
PAGE IS RESET →

| 1 | ▨ | 4 | 6 | 8 | 10 | 12 | 14 | 16 | 17 | 20 | 22 |
|---|---|---|---|---|----|----|----|----|----|----|----|
| 2 | 3 | 5 | 7 | 9 | 11 | 13 | 15 | 17 | 19 | 21 | 24 |

(2c)

ERROR PATTERN (13): MISSING-PAGE
                    ERROR NOTIFICATION
RESET LEADING  RECOVER
PAGE FOR       HERE IF
RECOVERY       TOO LATE
  [2]           ⇩ ~932    ⇩ ~934

| 1 | 4 | 6 | 8 | 9 | 11 | 13 | 15 | 17 | 19 | 21 | 23 |
|---|---|---|---|---|----|----|----|----|----|----|----|
| 2 | 5 | 7 | 9 | 10| 12 | 14 | 16 | 18 | 20 | 22 | 24 |

| 1 | 3 | 5 | 7 |
|---|---|---|---|
| 2 | 4 | 6 | 8 |

REPRINT (3a)                    (3b)

SUBSEQUENT PAGES ARE
ALL NG UNLESS LEADING
PAGE IS RESET →

| 1 | 4 | 6 | 8 | 10 | 12 | 14 | 16 | 18 | 20 | 22 | 24 |
|---|---|---|---|----|----|----|----|----|----|----|----|
| 2 | 5 | 7 | 9 | 11 | 13 | 15 | 17 | 19 | 21 | 23 | 25 |

(3c)

ERROR PATTERN (14): INTERCHANGED-PAGE
                    ERROR NOTIFICATION

| 1 | 75| 5 | 7 | 9 | 11 | 13 | 15 | 17 | 19 | 21 | 23 |
|---|---|---|---|---|----|----|----|----|----|----|----|
| 2 | 4 | 6 | 8 | 10| 12 | 14 | 16 | 18 | 20 | 22 | 24 |

| 1 | 3 | 5 | 7 |
|---|---|---|---|
| 2 | 4 | 6 | 8 |

REPRINT (4a)                    (4b)

ERROR PATTERN (15): MISCELLANEOUS
                    ERROR NOTIFICATION

| 1 | ▨ | 5 | 7 | 9 | 11 | 13 | 15 | 17 | 19 | 21 | 23 |
|---|---|---|---|---|----|----|----|----|----|----|----|
| 2 | 4 | 6 | 8 | 10| 12 | 14 | 16 | 18 | 20 | 22 | 24 |

| 1 | 3 | 5 | 7 |
|---|---|---|---|
| 2 | 4 | 6 | 8 |

REPRINT (5a)                    (5b)

FIG. 10A
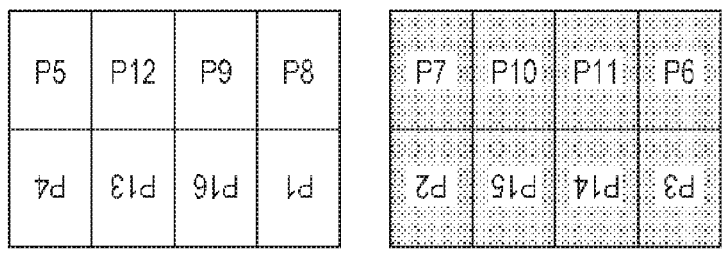
(1)
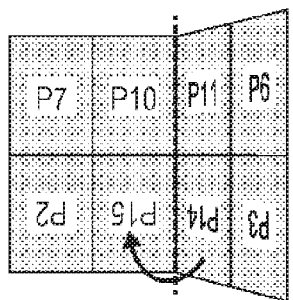
FOLD
(2a)
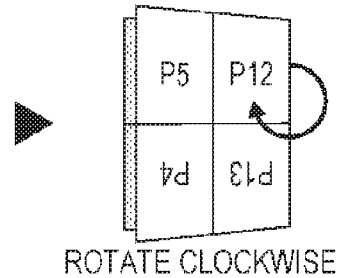
ROTATE CLOCKWISE
(2b)
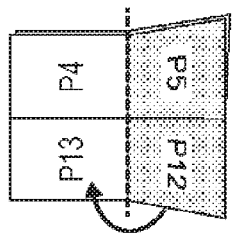
FOLD
(2c)
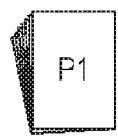
QUIRE HAVING FIRST
TO SIXTEENTH PAGES
IS COMPLETED
(2d)
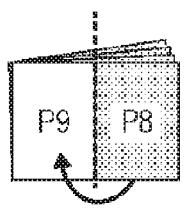
FOLD
(2e)
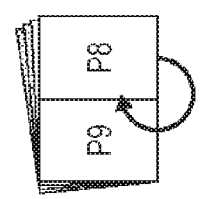
ROTATE CLOCKWISE
(2f)

(3)

| 7 | 10 | 11 | <u>6</u> | | 23 | 26 | 27 | 22 | | 39 | 42 | 43 | 38 | |
|---|----|----|----|--|----|----|----|----|--|----|----|----|----|--|
| 2 | 15 | 14 | 3 | | 18 | 31 | 30 | <span style="text-decoration:overline">19</span> | | 34 | 47 | 46 | 35 | ····· |

| 5 | 12 | <u>9</u> | 8 | | 21 | 28 | 25 | 24 | | 37 | 44 | 41 | 40 | |
|---|----|----|---|--|----|----|----|----|--|----|----|----|----|--|
| 4 | 13 | 16 | 1 | | 20 | 29 | 32 | 17 | | 36 | 45 | 48 | 33 | ····· |

(4)

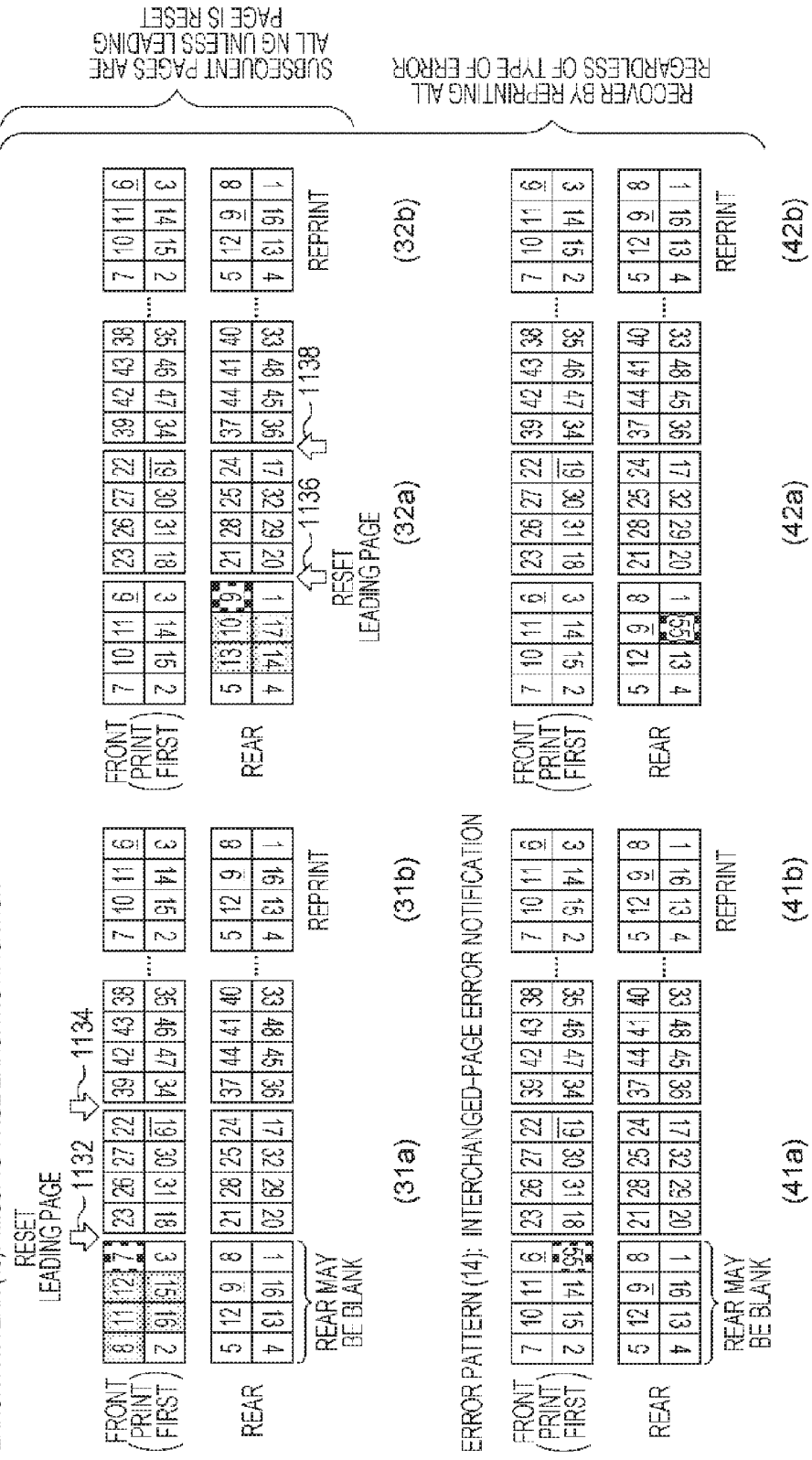

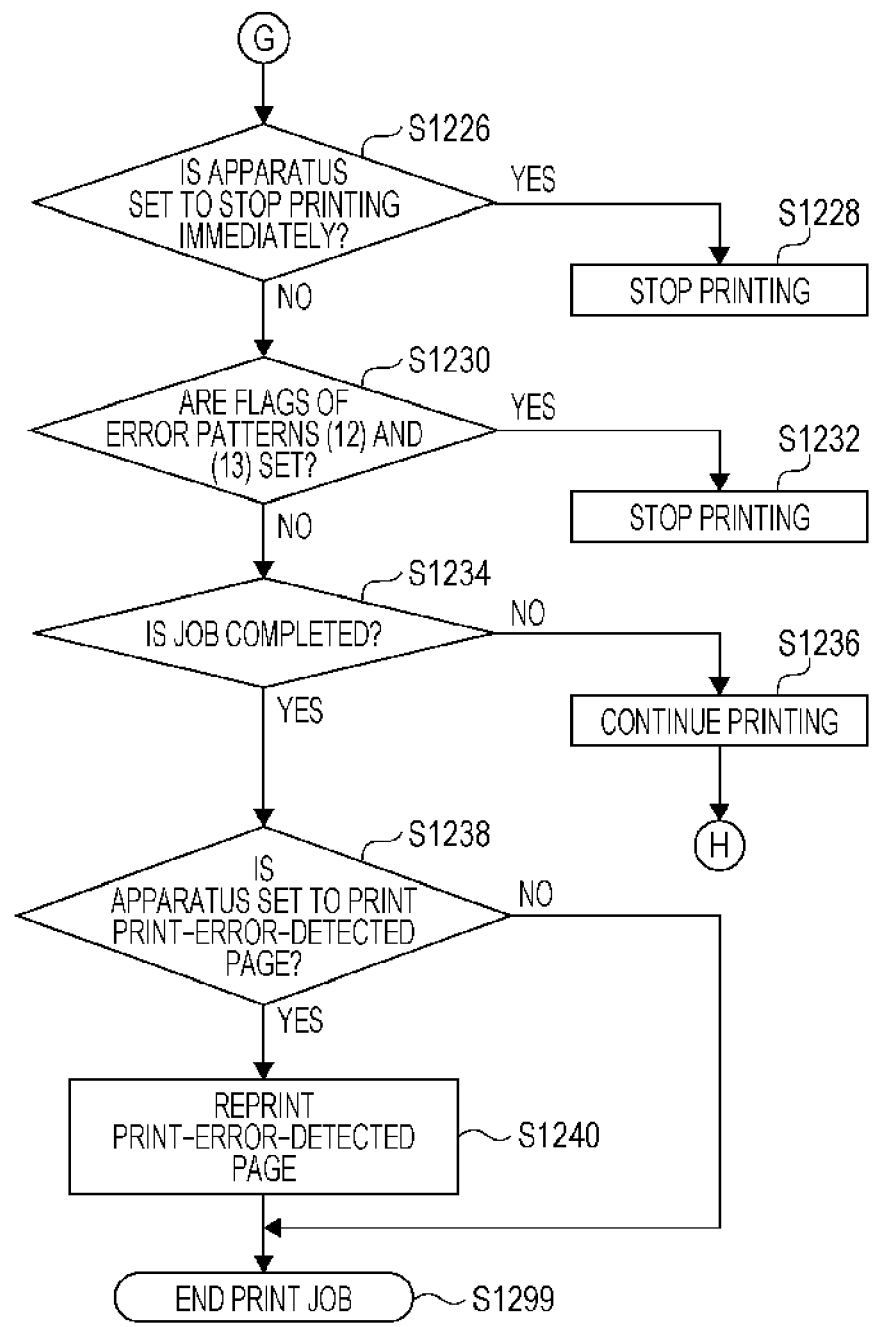

IMAGE PROCESSING APPARATUS, NON-TRANSITORY COMPUTER READABLE MEDIUM, AND IMAGE PROCESSING METHOD FOR DETERMINING WHETHER A PRINT JOB IS RECOVERABLE

CROSS-REFERENCE TO RELATED APPLICATIONS

This application is based on and claims priority under 35 USC 119 from Japanese Patent Application No. 2014-136854 filed Jul. 2, 2014.

BACKGROUND

Technical Field

The present invention relates to image processing apparatuses, non-transitory computer readable media, and image processing methods.

SUMMARY

According to an aspect of the invention, there is provided an image processing apparatus including a detection unit and a determination unit. The detection unit detects an error by comparing image data related to a print job with read image data obtained as a result of reading a print output related to the print job. The determination unit compares read image data related to a post-error print output, which is a continuously-printed print output related to the print job for a page subsequent to a page in which the error is detected, with the image data when the error is detected by the detection unit, so as to determine a process for recovering the print job by using the post-error print output.

BRIEF DESCRIPTION OF THE DRAWINGS

An exemplary embodiment of the present invention will be described in detail based on the following figures, wherein:

FIG. 1 is a module configuration diagram schematically illustrating a configuration example according to an exemplary embodiment;

FIG. 2 illustrates a configuration example of a print processing system according to the exemplary embodiment;

FIGS. 3A and 3B are a flowchart illustrating an example of a process according to the exemplary embodiment;

FIGS. 4(1a) to 4(5b) illustrate an example of a process according to the exemplary embodiment;

FIGS. 5A(11a) to 5B(52b) illustrate an example of a process according to the exemplary embodiment;

FIGS. 9(1a) to 9(5b) illustrate an example of a process according to the exemplary embodiment;

FIGS. 12A and 12B are a flowchart illustrating an example of a process according to the exemplary embodiment.

DETAILED DESCRIPTION

Figure 3A:
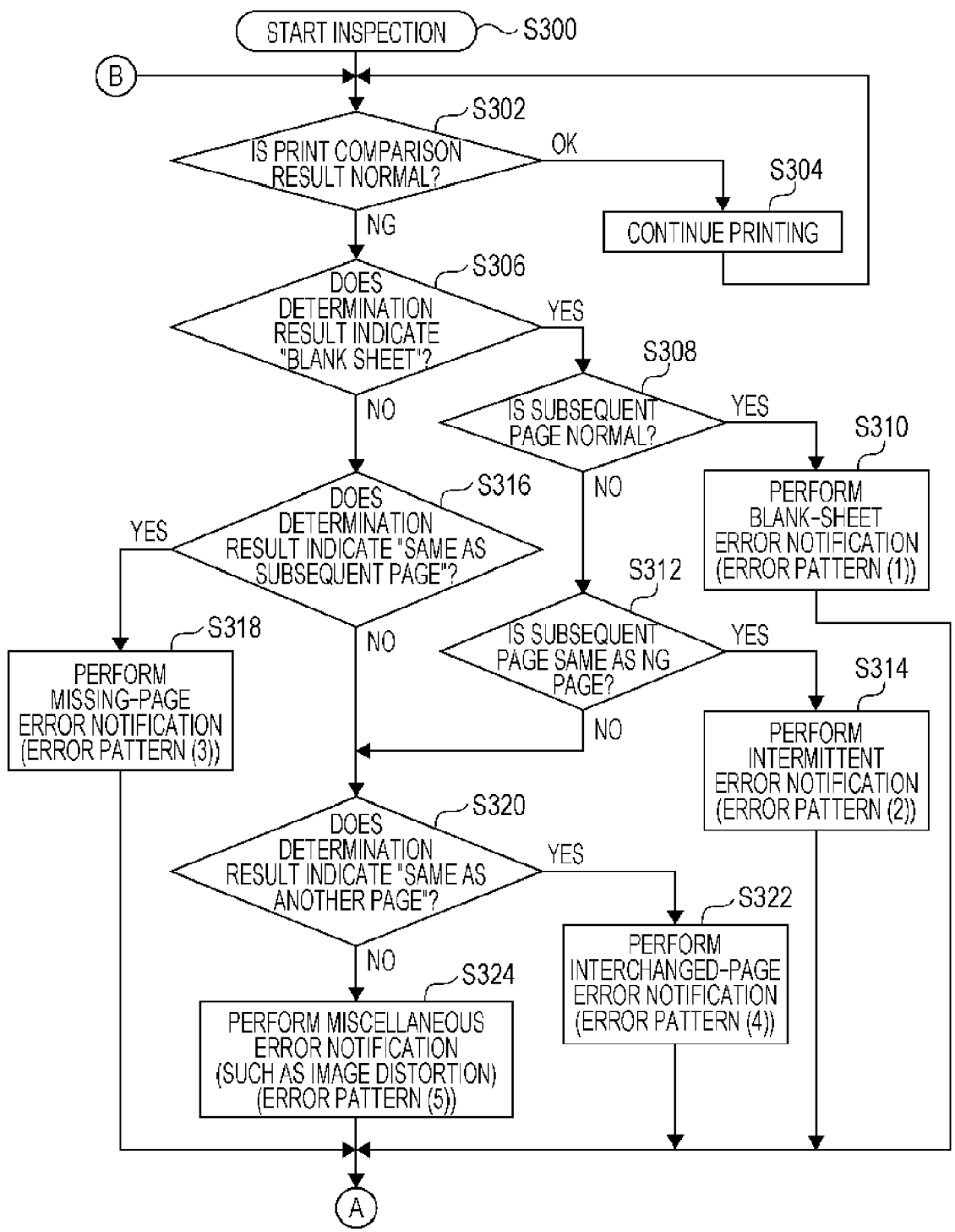

An exemplary embodiment of the present invention will be described below with reference to the drawings.

FIG. 1 is a module configuration diagram schematically illustrating a configuration example according to this exemplary embodiment.

The term "module" generally refers to a logically separable component, such as software (computer program) or hardware. Therefore, each module in this exemplary embodiment refers not only to a module in a computer program, but also to a module in a hardware configuration. Accordingly, this exemplary embodiment is directed to a description of a computer program for causing a computer to function as each module (i.e., a program for causing the computer to execute each procedure, a program for causing the computer to function as each unit, and a program for causing the computer to implement each function), as well as to a system and a method. Although the expressions "store data", "make a device store data", and expressions equivalent to these expressions are used for the sake of convenience, these expressions have a meaning of making a storage device store data or performing control to make the storage device store data if the exemplary embodiment corresponds to a computer program. The modules may correspond to the respective functions in a one-to-one fashion, but in actual implementation, each module may be constituted of a single program, multiple modules may be constituted of a single program, or each module may be constituted of multiple programs. Furthermore, multiple modules may be implemented by a single computer, or a single module may be implemented by multiple computers in a distributed or parallel environment. Moreover, a single module may include another module. The term "connection" used hereinafter refers not only to a physical connection, but also to a logical connection (i.e., exchanging of data, transmission of a command, or a reference relationship between data). The term "predetermined" refers to a state in which a value is preset before intended processing is to be performed, and includes not only a case where a value is preset prior to commencement of processing according to this exemplary embodiment, but also a case where a value is preset at a time point prior to the intended processing even when the processing according to this exemplary embodiment has already commenced, depending on the current condition or status or the previous condition or status. If there are multiple "predetermined values", the values may be different from each other, or two or more values (including all of the values) may be the same. Furthermore, the expression "in the case of A, B is performed" is used to indicate that "a process for determining A is performed, and if the determination result indicates A, B is performed". However, this excludes a case where it is not necessary to perform the process for determining A.

The terms "system" and "apparatus" include not only a configuration in which multiple computers, hardware units, or apparatuses are connected by a communication unit, such as a network (including one-to-one communication connections), but also a configuration achieved by a single computer, a single hardware unit, or a single apparatus. The terms "apparatus" and "system" are used as terms with an equivalent meaning. The term "system" does not include the meaning of a social system, which is a kind of a man-made agreement or arrangement. In a case where processing is to be performed by each module or multiple kinds of processing are to be performed within a module, target information is read from the storage device for each processing, and the processed result is written into the storage device upon completion of the processing. Therefore, descriptions regarding reading of information from the storage device before the processing and writing of information into the storage device after the processing are sometimes omitted. Examples of the storage device in this case may include a hard disk, a random access memory (RAM), an external storage medium, a storage device via a communication line, and a register within a central processing unit (CPU).

An image processing apparatus according to this exemplary embodiment is a digital printer that performs a print output in accordance with a print job. As shown in the example in FIG. 1, the digital printer includes an image-data reception module 110, a print module 120, a read module 130, and a print recovery process module 140.

The digital printer is used for, for example, small-lot printing and variable printing. Variable printing refers to performing printing on pages one-by-one such that the layout of print contents, such as text, a line drawing, or an image, is identical among the pages but the contents are interchanged. Therefore, in variable printing, the print contents normally vary from page to page. With regard to the expression "the print contents vary from page to page", the print contents do not necessarily have to vary among all of the pages. The expression may include a combination of successive pages with identical contents so long as the successive pages at least have a page with contents different from those of a target page.

A recovery process is a process for making an error-detected print job into a normal print job. In this exemplary embodiment, an example of an error pattern and a recovery process corresponding thereto will be described later with reference to, for example, FIGS. 4(1a) to 4(5b), FIGS. 5A(11a) to 5B(52b), FIGS. 9(1a) to 9(5b), and FIGS. 11A(11a), 11B, to 11C (52b).

The image-data reception module 110 is connected to the print module 120 and the print recovery process module 140. The image-data reception module 110 receives a print job together with image data to be printed, converts the image data into image data printable by the print module 120, and transmits the converted image data to the print module 120. Examples of the image data to be received include PostScript-language data and portable-document-format (PDF) data. A process to be performed by the image-data reception module 110 involves, for example, interpreting the PostScript language or the PDF format of the received image data and generating bit-mapped data (i.e., an example of image data according to a print job) by performing rasterize processing. The image-data reception module 110 may transmit the processed result to the print module 120 while performing the conversion process, or may store the processed result and transmit the processed result to the print module 120 upon completion of the conversion process.

The image data to be printed may include, for example, multiple pages, designation of duplex printing, designation of folding or cutting after collectively printing the multiple pages so as to make them into postcards, or designation of making the multiple printed pages into a quire of a book. The term "designation" may include a case where the designation is included in the print job or a case where the designation is set as default. The processed result is transmitted to the print module 120 in accordance with the sequence of this designation.

A process of putting multiple pages together is called "imposition". Sometimes, this may be called "set".

Furthermore, when data is to be transmitted from the image-data reception module 110 to the print module 120, the data transmission may be delayed depending on specific conditions, or the transmitted pages may be arranged in an unintended order. For example, this may occur when unexpected load is applied within the image-data reception module 110. This results in a print error.

For example, an error caused by the pages being arranged out of sequence becomes a waste even if the printing is continued in that state. Moreover, when the process is stopped after activation, it takes time to reactivate, resulting in reduced productivity. This is because, for example, reactivation involves adjustment of an ink head as well as reheating of a toner fixing mechanism.

Therefore, even when printing the entire print job in which an error has occurred or printing only a page in which an error has occurred, a certain amount of time may be necessary.

The print recovery process module 140 according to this exemplary embodiment detects such a print error and determines a process for recovery.

The print module 120 is connected to the image-data reception module 110 and the read module 130. The print module 120 receives the image data from the image-data reception module 110 and outputs a printed material of that image data. Specifically, the print module 120 forms and prints an image onto a transported sheet based on the received bit-mapped image by using ink or toner.

The print module 120 may be of a type that uses cut sheets (i.e., a sheet-fed type) or of a type that uses a rolled sheet (i.e., a continuous-sheet-fed type).

The read module 130 is connected to the print module 120 and the print recovery process module 140. The read module 130 reads the printed material output from the print module 120 and transmits the read image data to the print recovery process module 140. For example, an image sensor may be used to read the printed material. Specifically, an in-line scanner contained in, for example, the print module 120, a separately-provided scanner, or a camera is used to read the printed material.

The print recovery process module 140 is connected to the image-data reception module 110 and the read module 130. The print recovery process module 140 includes a detection module 145, a recovery determination module 150, a recovery-image determination module 155, a recovery execution module 160, a print-job stop module 165, an output module 170, and a control module 175.

The detection module 145 receives the image data related to the print job from the image-data reception module 110 and receives, from the read module 130, the read image data obtained as a result of reading the print output related to that print job. Then, the detection module 145 compares the image data with the read image data so as to detect an error. In order to deal with variable printing in which the print contents vary from page to page, the detection module 145 performs the error detection for every page.

For example, the detection module 145 detects an error by comparing a density histogram of the image data calculated for respective predetermined multiple regions with a density histogram of the read image data.

Specifically, with respect to the read image data received from the read module 130, the detection module 145 generates a histogram by measuring color data (e.g., RGB data) in each reed-shaped region in a sub scanning direction. The histogram to be generated may be a density histogram in which the density is separated into a single color or multiple colors.

Furthermore, the detection module 145 generates a similar histogram for the rasterized image data (which may be a thumbnail image) received from the image-data reception module 110.

Then, the two histograms are compared for each region. As the comparison result, if the difference between the two histograms is larger than a predetermined value or is larger than or equal to the predetermined value, an error is detected. For example, when an image has been interchanged or when an abnormal state occurs, such as an output of a blank sheet, an error is detected. In the print module 120, a process for feeding back a result obtained by changing the tone curve of the image data to the density histogram obtained by scanning the printed material (i.e., a process for eliminating the effect of tone curve adjustment) may be performed.

Furthermore, a result of data processing performed for ink adjustment may be used. Specifically, data generated for ink adjustment for each reed-shaped region in the sub scanning direction from a thumbnail image may be used.

Even when the print module 120 is commanded to stop the printing process immediately after the detection module 145 detects an error, the print module 120 may still perform a print output of a page or pages subsequent to the error-detected page. This may occur, for example, when the printing process is performed by the print module 120 at high speed, when it takes time to stop the printing process performed by the print module 120, or when the error detection by the detection module 145 is slower than the printing process performed by the print module 120.

The control module 175 controls each module within the print recovery process module 140. For example, when the detection module 145 detects an error, the control module 175 compares the read image data related to a post-error print output, which is a print output for a page or pages subsequent to the error-detected page, with the image data by using, for example, the recovery determination module 150 and the recovery-image determination module 155 so as to determine a process for recovering the print job by using the post-error print output.

In accordance with the control by the control module 175, when the detection module 145 detects an error, the recovery determination module 150 compares the read image data related to the post-error print output, which is a print output for a page or pages subsequent to the error-detected page, with the image data so as to determine whether or not the print job is recoverable by using that post-error print output. Specifically, the determination process in this case involves, for example, classification into error patterns (1) to (5), which will be described later. The classification into the error patterns (1) to (5) is equivalent to determination of a recovery process corresponding to an error pattern.

In accordance with the control by the control module 175, when the recovery determination module 150 determines that the print job is recoverable, the recovery-image determination module 155 determines recovery image data to be used for the recovery in addition to the post-error print output.

Alternatively, the recovery-image determination module 155 may determine image data of a page or pages subsequent to the error-detected page as the recovery image data.

The recovery execution module 160 executes a recovery print job, which uses the recovery image data determined by the recovery-image determination module 155, upon completion of the current print output.

Alternatively, the recovery execution module 160 may execute the recovery print job when stoppage of the print job is cancelled.

The print-job stop module 165 stops the print job if the recovery determination module 150 determines that the print job is not recoverable.

The output module 170 outputs recovery-related information of the print job. For example, the recovery-related information may be the image data of the error-detected page. In this case, an output page may be replaced with the error-detected page. Alternatively, information used for recovery may be output. The term "output" includes, for example, performing printing using a printing device, such as a printer, performing display using a display device, such as a display, writing the information into a storage device, storing the information into a storage medium, such as a memory card, or transmitting the information to another information processing apparatus. Furthermore, the output-destination printing device may be the print module 120 or another printing device.

In particular, when variable printing is being performed, for example, if some pages are defective or missing due to a certain kind of error, the output module 170 performs a replacement print output without having to temporarily stop the print job or to execute the print job again upon completion of the print job (while continuing with the target print job).

Furthermore, the print recovery process module 140 may have a storage device that stores the image data received from the image-data reception module 110. The output module 170 may extract the image data of the error-detected page from that storage device and output the image data.

FIG. 2 illustrates a configuration example of a print processing system according to this exemplary embodiment.

A client 210 and an image-data generating apparatus 220 are connected to each other via a communication line 290. The image-data generating apparatus 220 and a digital printer 230 are connected to each other via a dedicated connection line.

The client 210 generates print data 215 by using, for example, a variable-printing document format and data and transmits the print data 215 to the image-data generating apparatus 220. The print data 215 is, for example, a PDF file.

The image-data generating apparatus 220 transmits print data 225 to the digital printer 230 and receives a result notification 255 from the digital printer 230. The image-data generating apparatus 220 has the image-data reception module 110 and the print recovery process module 140 and attempts to recover a print job by utilizing a print output after error detection. Moreover, the image-data generating apparatus 220 continues to output a lacking page or pages for the recovery upon completion of the print job. The print data 225 is image data expressed by, for example, cyan (C), magenta (M), yellow (Y), and black (K) colors (CMYK).

The digital printer 230 has a print module 235 as the print module 120, a transport path 245, a sensor 240 as the read module 130, and a post-processing device 250 (also called a finisher). The print module 235 performs printing and transmits the print output (i.e., printed material) to the post-processing device 250 via the transport path 245. The sensor 240 reads the print output from the digital printer 230 and transmits the read image data as the result notification 255 to the image-data generating apparatus 220. The post-processing device 250 accumulates print outputs or performs a process, such as collation, folding, binding, cutting, packaging, and/or sealing, on each print output.

The transport path 245 is used for transporting the printed material output from the print module 235 to the post-processing device 250.

The sensor 240 reads the printed material transported by the transport path 245 as image data. The sensor 240 may be configured to read not only the front face of the printed material but also the rear face thereof.

FIGS. 3A and 3B are a flowchart illustrating an example of a process according to this exemplary embodiment. The process in this case is not an imposition process but is a printing process performed in units of pages.

In step S300, an inspection starts. This inspection is a process performed in a case where it is detected that an imposition process is not necessary based on information related to designation of post-processing (such as binding or collation) after printing. Needless to say, image data from the image-data reception module 110 and read image data from the read module 130 (i.e., data obtained by causing the print module 120 to print the image data and reading the print output thereof) are both received. Moreover, image data of all pages may be stored in advance.

In step S302, it is determined whether or not a comparison determination result between the image data and the read image data is normal. If normal (OK), the process proceeds to step S304. If not normal (NG), the process proceeds to step S306. As described above, the comparison determination process involves performing a process by the detection module 145.

In step S304, the printing continues. Subsequently, the process returns to step S302.

In step S306, it is determined whether or not the determination result (i.e., the read image data) indicates a blank sheet. If the determination result indicates a blank sheet, the process proceeds to step S308. Otherwise, the process proceeds to step S316. With regard to the determination of whether or not the determination result indicates a blank sheet, it may be determined that the determination result indicates a blank sheet if the area (or the area percentage) of a color region within the read image data is smaller than or equal to a predetermined threshold value or if the area (or the area percentage) of a white region within the read image data is larger than or equal to a predetermined threshold value. A color region is a pixel region having pixel values other than a white region, whereas a white region is a pixel region at least including a pixel value that indicates white color and having a pixel value smaller than or equal to a predetermined threshold value. For example, a pixel value that indicates white color corresponds to a pixel with the value zero for each of C, M, Y, and K. A maximum pixel value that may be regarded as white color in view of the characteristics of the sensor of the read module 130 is set as the predetermined threshold value. There is also a color system in which the pixel value indicating white color is set as the maximum pixel value (e.g., 255) for each of C, M, Y, and K. In that case, a pixel region having a pixel value larger than or equal to a predetermined threshold value may be set as the white region.

In step S308, it is determined whether or not a subsequent page is normal. If normal, the process proceeds to step S310. Otherwise, the process proceeds to step S312. A subsequent page is a page subsequent to the target page in step S302, and a comparison is performed between the image data and the printed image data of the subsequent page. The comparison process is the same as the process in step S302.

In step S310, a blank-sheet error notification is performed (i.e., an error pattern (1) is determined). Subsequently, the process proceeds to step S326.

In step S312, it is determined whether or not the subsequent page is the same as the NG page. If the subsequent page is the same as the NG page, the process proceeds to step S314. Otherwise, the process proceeds to step S320. In this case, the NG page is the target page in step S302 (i.e., the page determined to be not normal).

In step S314, an intermittent error notification is performed (i.e., an error pattern (2) is determined). Then, the process proceeds to step S326.

In step S316, it is determined whether or not the determination result indicates "the same as subsequent page". If the determination result indicates "the same as subsequent page", the process proceeds to step S318. Otherwise, the process proceeds to step S320. The expression "the same as subsequent page" corresponds to a case where the read image data of the target page in step S302 is the same as the image data of the page subsequent to the target page in step S302. In other words, this corresponds to a case where printing of one page worth of image data is not performed.

In step S318, a missing-page error notification is performed (i.e., an error pattern (3) is determined). Then, the process proceeds to step S326.

In step S320, it is determined whether or not the determination result indicates "the same as another page". If the determination result indicates "the same as another page", the process proceeds to step S322. Otherwise, the process proceeds to step S324. The expression "the same as another page" corresponds to a case where the read image data of the target page in step S302 is the same as the image data of any one of pages in the image data received from the image-data reception module 110 (but excluding the image data of the target page in step S302 and the image data of the subsequent page). In other words, this corresponds to a case where there is printed image data of a page different from the page to be originally output and the page subsequent thereto.

In step S322, an interchanged-page error notification is performed (i.e., an error pattern (4) is determined). Then, the process proceeds to step S326.

In step S324, a miscellaneous error notification (such as image distortion) is performed (i.e., an error pattern (5) is determined).

The error patterns ((1), (4), and (5)) other than the error patterns (2) and (3) may be determined based on a condition in which the image data of the target subsequent page is the same as the printed image data. In other words, the determination may be performed based on a condition in which only the printed image data of the target page is incorrect but the image data of a subsequent page or pages and the printed image data are not incorrect.

In step S326, it is determined whether or not the apparatus is set to stop printing immediately. If the apparatus is set to stop printing immediately, the process proceeds to step S328. Otherwise, the process proceeds to step S330. The setting in this case (i.e., the setting for stopping printing immediately) is based on any one of or a combination of the error patterns (1) to (5) and may be set in advance by a user, such as the administrator, or may be set in advance as default.

In step S328, the printing is stopped.

In step S330, it is determined whether or not the print job has been completed. If the print job has been completed, the process proceeds to step S334. Otherwise, the process proceeds to step S332.

In step S332, the printing based on that print job continues. Subsequently, the process returns to step S302.

In step S334, it is determined whether or not the apparatus is set to print the print-error-detected page. If the apparatus is set to print the print-error-detected page, the process proceeds to step S336. Otherwise, the print job ends in step S399.

In step S336, the image data of the print-error-detected page is printed again. The error-page reprinting pattern varies depending on simplex printing or duplex printing, or an error based on any one of the error patterns (1) to (5). This will be described in detail with reference to FIGS. 4(1a) to 4(5b) and FIGS. 5A(11a) to 5B(52b).

In step S399, the print job ends.

FIGS. 4(1a) to 4(5b) illustrate a control example of a method of continuing with a print job upon error detection when simplex printing is performed.

FIGS. 4(1a) and 4(1b) illustrate an example of the error pattern (1) detected in step S308 and show an example of the contents of the blank-paper error notification. Specifically, FIG. 4(1a) illustrates an example in which the third page is a blank page (i.e., the first and second pages are normal and the fourth page and onward are also normal). FIG. 4(1b) shows that the third page, which is an NG page, is printed as a recovery process. A command of "replace the blank third page with a newly printed material" may be displayed on, for example, a display device, such as a liquid crystal display, of the print recovery process module 140.

FIGS. 4(2a) and 4(2b) illustrate an example of the error pattern (2) detected in step S312 and show an example of the contents of the intermittent error notification. Specifically, FIG. 4(2a) illustrates an example in which a blank page is undesirably inserted between the second page and the third page. FIG. 4(2b) shows that the third page (i.e., a blank page), which is an NG page, is discarded as a recovery process. A command of "discard the blank third page" may be displayed on, for example, the display device of the print recovery process module 140.

FIGS. 4(3a) and 4(3b) illustrate an example of the error pattern (3) detected in step S316 and show an example of the contents of the missing-page error notification. Specifically, FIG. 4(3a) illustrates an example in which the third page is missing. FIG. 4(3b) shows that the third page, which is an NG page, is printed as a recovery process. A command of "insert a newly printed material into the third page" may be displayed on, for example, the display device of the print recovery process module 140.

FIGS. 4(4a) and 4(4b) illustrate an example of the error pattern (4) detected in step S320 and show an example of the contents of the interchanged-page error notification. Specifically, FIG. 4(4a) illustrates an example in which the third page is interchanged with the 89-th page. FIG. 4(4b) shows that the third page, which is an NG page, is printed as a recovery process. A command of "replace the printed material of the third page with a newly printed material" may be displayed on, for example, the display device of the print recovery process module 140.

FIGS. 4(5a) and 4(5b) illustrate an example of the error pattern (5) detected in step S320 and show an example of the contents of the miscellaneous error notification (such as image distortion). FIG. 4(5a) illustrates an example in which image distortion has occurred in the third page. A command of "replace the printed material of the third page with a newly printed material" may be displayed on, for example, the display device of the print recovery process module 140. Likewise, the contents of the recovery process may be displayed on the display device thereafter.

FIGS. 5A(11a) to 5B(52b) illustrate a control example of a method of continuing with a print job upon error detection when duplex printing is performed. In the determination steps in the flowchart shown in the example in FIGS. 3A and 3B, a process for determining any one of the error patterns in the example shown in FIGS. 5A(11a) to 5B(52b) may be performed. For example, a determination process with respect to the front and rear faces may be performed.

FIGS. 5A(11a) to 5A(12b) illustrate an example of the error pattern (1) detected in step S308 and show an example of the contents of the blank-paper error notification.

FIGS. 5A(11a) and 5B(11b) illustrate an example in which the front face of the third page is blank. Specifically, FIG. 5A(11a) illustrates an example in which the front face of the third page is blank (i.e., the first and second pages are normal and the fourth page and onward are also normal). FIG. 5A(11b) shows that the third page (i.e., both the front and rear faces thereof), which is an NG page, is printed as a recovery process. A command of "replace the third page with a newly printed material" may be displayed on, for example, the display device of the print recovery process module 140.

FIGS. 5A(12a) and 5A(12b) illustrate an example in which the rear face of the third page is blank. Specifically, FIG. 5A(12a) illustrates an example in which the rear face of the third page is blank (i.e., the first and second pages are normal and the fourth page and onward are also normal). FIG. 5A(12b) shows that the third page (i.e., both the front and rear faces thereof), which is an NG page, is printed as a recovery process. A command of "replace the third page with a newly printed material" may be displayed on, for example, the display device of the print recovery process module 140.

FIGS. 5A(21a) to 5A(22b) illustrate an example of the error pattern (2) detected in step S312 and show an example of the contents of the intermittent error notification.

FIG. 5A(21a) illustrates an example in which a page with blank front and rear faces is undesirably inserted between the second page and the third page. FIG. 5A(21b) shows that the third page (i.e., a blank page), which is an NG page, is discarded as a recovery process. A command of "discard the blank third page" may be displayed on, for example, the display device of the print recovery process module 140.

FIG. 5A(22a) illustrates an example in which a page is undesirably inserted between the rear face of the second page and the rear face of the third page. Subsequently, for the rear face, the third page is printed subsequent to the blank page, and then the fifth page is printed, such that the front and rear faces of the pages accord with each other. Upon detection that a page has been undesirably inserted, the control module 175 may control the image-data reception module 110 or the print module 120 such that the front and rear faces of the printed pages accord with each other from the fifth page and onward. In this case, pages with non-according front and rear faces (i.e., the third and fourth pages in the example in FIG. 5A(22a)) are detected. FIG. 5A(22b) shows that the third and fourth pages (i.e., both the front and rear faces thereof), which are NG pages, are printed as a recovery process. A command of "replace the third and fourth pages with newly printed materials" may be displayed on, for example, the display device of the print recovery process module 140.

FIGS. 5A(31a) to 5A(32b) illustrate an example of the error pattern (3) detected in step S316 and show an example of the contents of the missing-page error notification.

FIG. 5A(31a) illustrates an example in which the front and rear faces of the third page are missing. FIG. 5A(31b)

shows that the third page (i.e., both the front and rear faces thereof), which is an NG page, is printed as a recovery process. A command of "insert a newly printed material into the third page" may be displayed on, for example, the display device of the print recovery process module 140.

FIG. 5A(32a) illustrates an example in which the rear face of the third page is missing. Subsequently, for the rear face, the fourth page is printed on the next page, such that the front and rear faces of the pages accord with each other. Upon detection that a page is missing, the control module 175 may control the image-data reception module 110 or the print module 120 such that the front and rear faces of the printed pages accord with each other from the fourth page and onward. In this case, a page with non-according front and rear faces (i.e., the third page in the example in FIG. 5A(32a)) is detected. FIG. 5A(32b) shows that the third page (i.e., both the front and rear faces thereof), which is an NG page, is printed as a recovery process. A command of "replace the third page with a newly printed material" may be displayed on, for example, the display device of the print recovery process module 140.

FIGS. 5B(41a) to 5B(42b) illustrate an example of the error pattern (4) detected in step S320 and show an example of the contents of the interchanged-page error notification.

FIG. 5B(41a) illustrates an example in which the front face of the third page is interchanged with the 89-th page. FIG. 5B(41b) shows that the third page (i.e., both the front and rear faces thereof), which is an NG page, is printed as a recovery process. A command of "replace the printed material of the third page with a newly printed material" may be displayed on, for example, the display device of the print recovery process module 140.

FIG. 5B(42a) illustrates an example in which the rear face of the third page is interchanged with the 89-th page. FIG. 5B(42b) shows that the third page (i.e., both the front and rear faces thereof), which is an NG page, is printed as a recovery process. A command of "replace the printed material of the third page with a newly printed material" may be displayed on, for example, the display device of the print recovery process module 140.

FIGS. 5B(51a) to 5B(52b) illustrate an example of the error pattern (5) detected in step S320 and show an example of the contents of the miscellaneous error notification (such as image distortion).

FIG. 5B(51a) illustrates an example in which image distortion has occurred on the front face of the third page. FIG. 5B(51b) shows that the third page (i.e., both the front and rear faces thereof), which is an NG page, is printed as a recovery process. A command of "replace the printed material of the third page with a newly printed material" may be displayed on, for example, the display device of the print recovery process module 140.

FIG. 5B(52a) illustrates an example in which image distortion has occurred on the rear face of the third page. FIG. 5B(52b) shows that the third page (i.e., both the front and rear faces thereof), which is an NG page, is printed as a recovery process. A command of "replace the printed material of the third page with a newly printed material" may be displayed on, for example, the display device of the print recovery process module 140.

As in the examples shown in FIGS. 5A(11a), 5B(41a), and 5B(51a), when an error is detected in the front face, the control module 175 may control the image-data reception module 110 or the print module 120 such that the rear faces are printed in the normal printing sequence.

Moreover, as in the examples shown in FIGS. 5A(12a), 5B(42a), and 5B(52a), when an error is detected in the rear face, the control module 175 may control the image-data reception module 110 or the print module 120 such that the rear faces are continuously printed in the normal printing sequence.

Furthermore, as in the example shown in FIG. 5A(21a), when an error is detected in the front face, the control module 175 may control the image-data reception module 110 or the print module 120 so as to insert a blank page (or a dummy page) for the rear face of the error-detected page.

Furthermore, as in the example shown in FIG. 5A(22a), when an error is detected in the rear face, the control module 175 may perform a process for skipping a page (i.e., one page) subsequent to the error-detected page. In other words, in this example, since a determination process for two pages (i.e., a determination process for the target page and the subsequent page) is performed, the control module 175 may control the image-data reception module 110 or the print module 120 so as to skip the rear face of the fourth page and to make the front and rear faces accord with each other from the fifth page and onward, as in the example shown in FIG. 5A(22a).

Furthermore, as in the example shown in FIG. 5A(31a), when an error is detected in the front face, the control module 175 may control the image-data reception module 110 or the print module 120 so as to also skip the rear face of the error-detected page, which corresponds to the front face (i.e., skip the rear face of the third page in the case of FIG. 5B(51a)).

Furthermore, as in the example shown in FIG. 5A(32a), when an error is detected in the rear face, the control module 175 may control the image-data reception module 110 or the print module 120 so as to insert one blank page (or one dummy page) during subsequent rear-face printing (i.e., insert the rear face of the fourth page as a dummy page in the case of FIG. 5A(32a)).

Figure 6A:
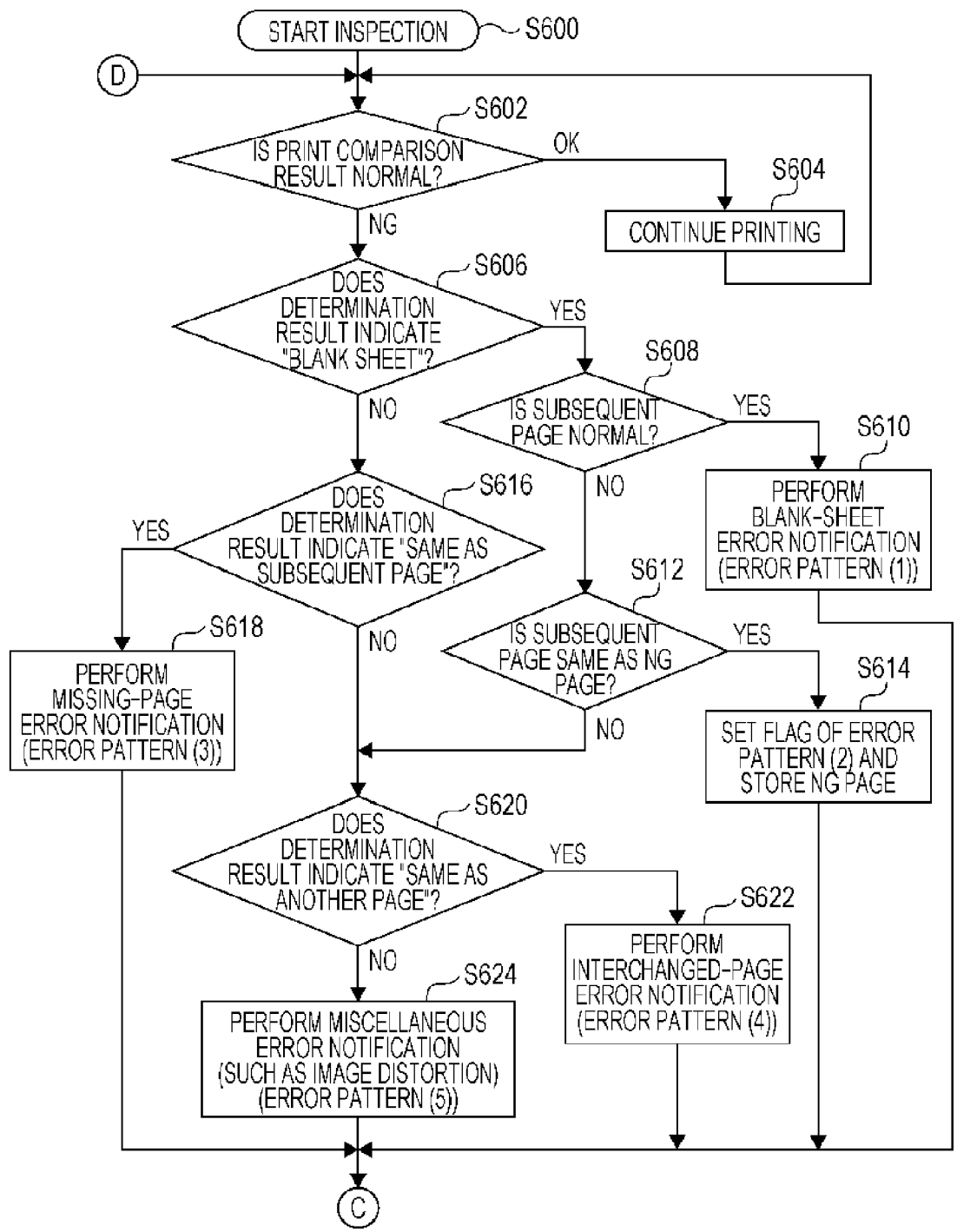
FIGS. 6A and 6B are a flowchart illustrating an example of a process according to the exemplary embodiment.
Figure 6B:
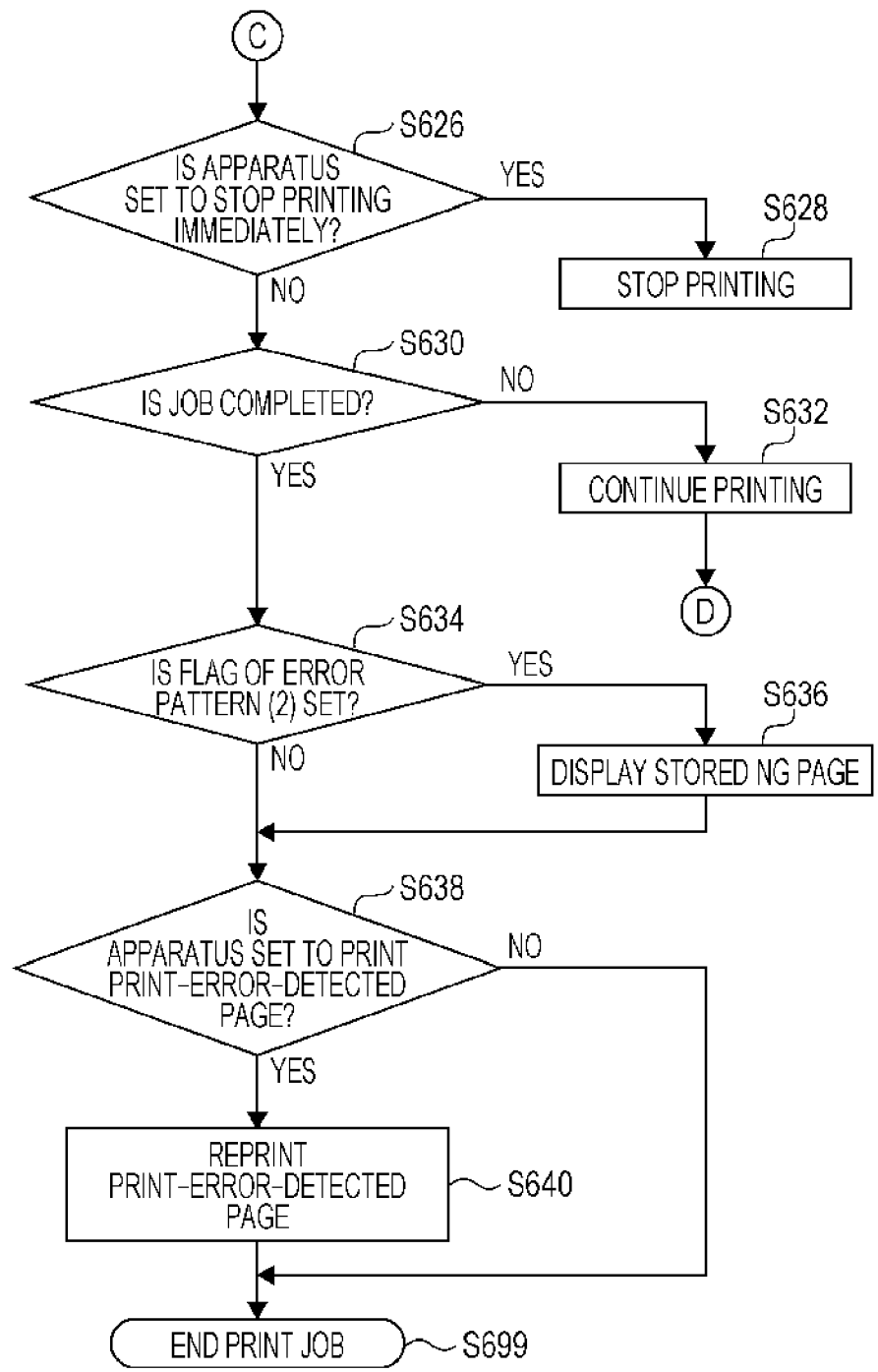

FIGS. 6A and 6B are a flowchart illustrating an example of a process according to this exemplary embodiment. In this process, step S314 in the flowchart shown in the example in FIGS. 3A and 3B has been changed to step S614, and step S634 and step S636 have been added.

In step S600, an inspection starts.

In step S602, it is determined whether or not a print comparison determination result is normal. If normal (OK), the process proceeds to step S604. If not normal (NG), the process proceeds to step S606.

In step S604, the printing continues. Subsequently, the process returns to step S602.

In step S606, it is determined whether or not the determination result indicates a blank sheet. If the determination result indicates a blank sheet, the process proceeds to step S608. Otherwise, the process proceeds to step S616.

In step S608, it is determined whether or not a subsequent page is normal. If normal, the process proceeds to step S610. Otherwise, the process proceeds to step S612.

In step S610, a blank-sheet error notification is performed (i.e., the error pattern (1) is determined). Subsequently, the process proceeds to step S626.

In step S612, it is determined whether or not the subsequent page is the same as the NG page. If the subsequent page is the same as the NG page, the process proceeds to step S614. Otherwise, the process proceeds to step S620.

In step S614, a flag of the error pattern (2) is set (i.e., the error pattern (2) is determined), and the NG page is stored. Subsequently, the process proceeds to step S626.

In step S616, it is determined whether or not the determination result indicates "the same as subsequent page". If the determination result indicates "the same as subsequent page", the process proceeds to step S618. Otherwise, the process proceeds to step S620.

In step S618, a missing-page error notification is performed (i.e., the error pattern (3) is determined). Then, the process proceeds to step S626.

In step S620, it is determined whether or not the determination result indicates "the same as another page". If the determination result indicates "the same as another page", the process proceeds to step S622. Otherwise, the process proceeds to step S624.

In step S622, an interchanged-page error notification is performed (i.e., the error pattern (4) is determined). Then, the process proceeds to step S626.

In step S624, a miscellaneous error notification (such as image distortion) is performed (i.e., the error pattern (5) is determined).

In step S626, it is determined whether or not the apparatus is set to stop printing immediately. If the apparatus is set to stop printing immediately, the process proceeds to step S628. Otherwise, the process proceeds to step S630.

In step S628, the printing is stopped.

In step S630, it is determined whether or not the print job has been completed. If the print job has been completed, the process proceeds to step S634. Otherwise, the process proceeds to step S632.

In step S632, the printing continues. Subsequently, the process returns to step S602.

In step S634, it is determined whether or not the flag of the error pattern (2) is set. If the flag is set, the process proceeds to step S636. Otherwise, the process proceeds to step S638.

In step S636, the stored NG page is displayed. In other words, the number of blank pages (i.e., pages to be discarded) is displayed on, for example, the display device of the print recovery process module 140.

In step S638, it is determined whether or not the apparatus is set to print the print-error-detected page. If the apparatus is set to print the print-error-detected page, the process proceeds to step S640. Otherwise, the print job ends in step S699.

In step S640, the image data of the print-error-detected page is printed again. The error-page reprinting pattern varies depending on simplex printing or duplex printing, or an error based on any one of the error patterns (1) to (5).

In step S699, the print job ends.

Figure 7A:
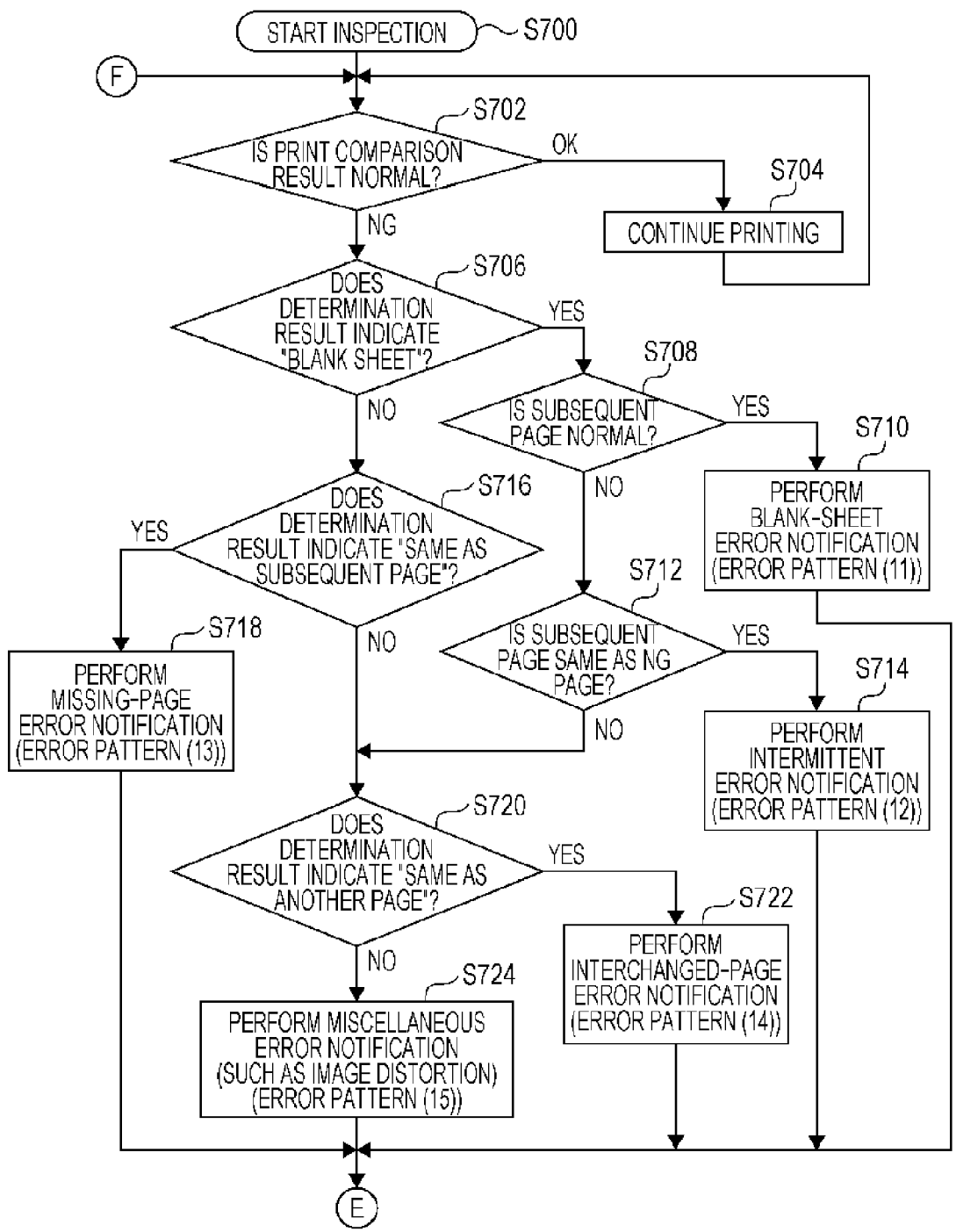
FIGS. 7A and 7B are a flowchart illustrating an example of a process according to the exemplary embodiment.
Figure 7B:
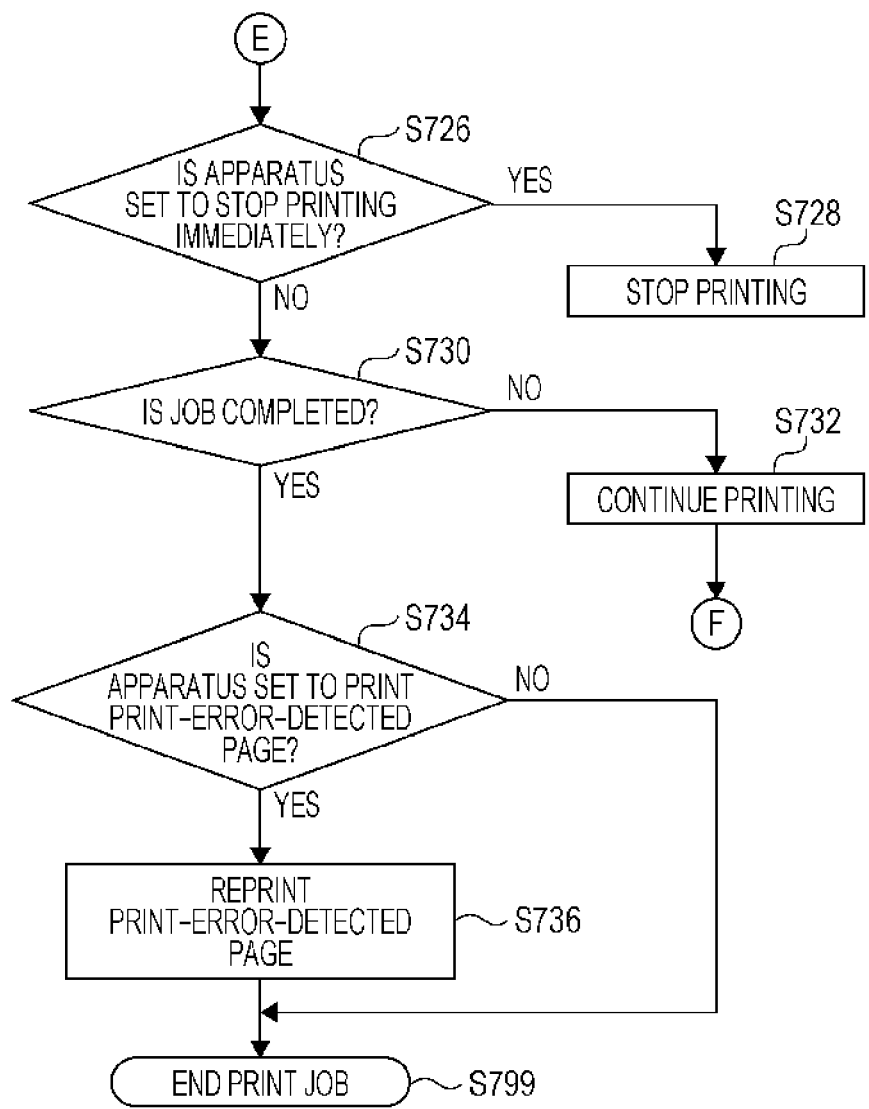

FIGS. 7A and 7B are a flowchart illustrating an example of a process according to this exemplary embodiment. In this process, an imposition process is performed, and a printing process is performed in units of sets. Although this process includes steps similar to those in the flowchart shown in the example in FIGS. 3A and 3B, the recovery process is performed in units of sets.

In step S700, an inspection starts. This inspection is a process performed in a case where it is detected that an imposition process is to be performed based on information related to designation of post-processing (such as binding or collation) after printing. Needless to say, image data from the image-data reception module 110 and read image data from the read module 130 (i.e., data obtained by causing the print module 120 to print the image data and reading the print output thereof) are both received. Moreover, image data of all pages may be stored in advance.

In step S702, it is determined whether or not a print comparison determination result is normal. If normal (OK), the process proceeds to step S704. If not normal (NG), the process proceeds to step S706.

In step S704, the printing continues. Subsequently, the process returns to step S702.

In step S706, it is determined whether or not the determination result indicates a blank sheet. If the determination result indicates a blank sheet, the process proceeds to step S708. Otherwise, the process proceeds to step S716.

In step S708, it is determined whether or not a subsequent page is normal. If normal, the process proceeds to step S710. Otherwise, the process proceeds to step S712.

In step S710, a blank-sheet error notification is performed (i.e., an error pattern (11) is determined). Subsequently, the process proceeds to step S726.

In step S712, it is determined whether or not the subsequent page is the same as the NG page. If the subsequent page is the same as the NG page, the process proceeds to step S714. Otherwise, the process proceeds to step S720.

In step S714, an intermittent error notification is performed (i.e., an error pattern (12) is determined). Then, the process proceeds to step S726.

In step S716, it is determined whether or not the determination result indicates "the same as subsequent page". If the determination result indicates "the same as subsequent page", the process proceeds to step S718. Otherwise, the process proceeds to step S720.

In step S718, a missing-page error notification is performed (i.e., an error pattern (13) is determined). Then, the process proceeds to step S726.

In step S720, it is determined whether or not the determination result indicates "the same as another page". If the determination result indicates "the same as another page", the process proceeds to step S722. Otherwise, the process proceeds to step S724.

In step S722, an interchanged-page error notification is performed (i.e., an error pattern (14) is determined). Then, the process proceeds to step S726.

In step S724, a miscellaneous error notification (such as image distortion) is performed (i.e., an error pattern (15) is determined).

In step S726, it is determined whether or not the apparatus is set to stop printing immediately. If the apparatus is set to stop printing immediately, the process proceeds to step S728. Otherwise, the process proceeds to step S730.

In step S728, the printing is stopped.

In step S730, it is determined whether or not the print job has been completed. If the print job has been completed, the process proceeds to step S734. Otherwise, the process proceeds to step S732.

In step S732, the printing continues. Recovery restart page calculation and setting are performed. Subsequently, the process returns to step S702.

In step S734, it is determined whether or not the apparatus is set to print the print-error-detected set. If the apparatus is set to print the print-error-detected set, the process proceeds to step S736. Otherwise, the print job ends in step S799.

In step S736, the image data of the print-error-detected set is printed again. The error-page reprinting pattern varies depending on simplex printing or duplex printing, or an error based on any one of the error patterns (11) to (15).

In step S799, the print job ends.

Figure 8:
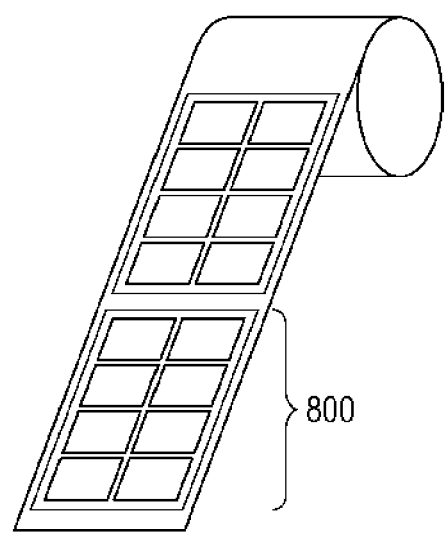
FIGS. 8(1) and 8(2) illustrate an example of a process according to the exemplary embodiment.

FIGS. 8(1) and 8(2) illustrate an example of a process according to this exemplary embodiment. This example indicates a case where an imposition process is performed on eight pages.

A set 810 shown in the example in FIG. 8(1) has the first page to the eighth page as a unit. A set 820 has the ninth page to the 16-th page as a unit. A set 830 has the 17-th page to the 24-th page as a unit. In accordance with the specifications of binding, the specifications of quire and imposition are set in advance.

In the example shown in FIG. 8(2), a set 800, which is a quire unit, has been printed on a continuous sheet, which is a printing medium. When reprinting is to be performed as a recovery process after detecting a print error, a process in units of sets (quires) is performed.

FIGS. 9(1a) to 9(5b) illustrate a control example of a method of continuing with a print job upon error detection when simplex printing is performed in units of sets. Regardless of the type of error pattern, reprinting is performed in units of sets.

FIGS. 9(1a) and 9(1b) illustrate an example of the error pattern (11) detected in step S708 and show an example of the contents of the blank-paper error notification. Specifically, FIG. 9(1a) illustrates an example in which the third page in the first set is a blank page. FIG. 9(1b) shows that the set including the third page, which is an NG page, is printed as a recovery process. A command of "replace the set including the third page with a newly printed material" may be displayed on, for example, the display device of the print recovery process module 140.

FIGS. 9(2a) to 9(2c) illustrate an example of the error pattern (12) detected in step S712 and show an example of the contents of the intermittent error notification. Specifically, FIG. 9(2a) illustrates an example in which a page is undesirably inserted between the second page and the third page in the first set. FIG. 9(2b) shows that the set including the third page, which is an NG page, is printed as a recovery process. A command of "replace the set including the third page with a newly printed material" may be displayed on, for example, the display device of the print recovery process module 140.

Then, a leading page of a set to be printed is set as a page assuming that the error-detected set is normal. For example, at a time point (i.e., a recovery point 922) at which printing of the set including the third page, which is an NG page, ends, the leading page of the second set is set as the ninth page. If the recovery point 922 is too late, the leading page of the third set, which is the next set, is set as the 17-th page at a time point (i.e., a recovery point 924) for printing the next set. If a leading page of a set is not set, it may be necessary to reprint all subsequent sets, as shown in the example in FIG. 9(2c). In this exemplary embodiment, the number of sets to be reprinted in this recovery process (i.e., a process for resetting a leading page of a set to be printed) may be reduced.

FIGS. 9(3a) to 9(3c) illustrate an example of the error pattern (13) detected in step S716 and show an example of the contents of the missing-page error notification. Specifically, FIG. 9(3a) illustrates an example in which the third page in the first set is missing (i.e., the fourth page is printed on the original third page, the same applies hereinafter). FIG. 9(3b) shows that the set including the third page, which is an NG page, is printed as a recovery process. A command of "replace the set including the third page with a newly printed material" may be displayed on, for example, the display device of the print recovery process module 140.

Then, a leading page of a set to be printed is set as a page assuming that the error-detected set is normal. For example, at a time point (i.e., a recovery point 932) at which printing of the set including the third page, which is an NG page, ends, the leading page of the second set, which is the next set, is set as the ninth page. If the recovery point 932 is too late, the leading page of the third set, which is the next set, is set as the 17-th page at a time point (i.e., a recovery point 934) for printing the next set. If a leading page of a set is not set, it may be necessary to reprint all subsequent sets, as shown in the example in FIG. 9(3c). In this exemplary embodiment, the number of sets to be reprinted in this recovery process (i.e., a process for resetting a leading page of a set to be printed) may be reduced.

In order to perform the process for resetting a leading page of a set to be printed, a calculation module that calculates the leading page of imposed pages included in the set may be provided. The calculation module calculates the leading page of a set by using the number of pages constituting the set and a set number to be printed. When an error is detected (in the course of printing), the calculation module calculates the leading page of the set and sets the calculated leading page into the image-data reception module 110 or the print module 120. Alternatively, a table that stores therein the leading page of each set in advance may be stored within the print recovery process module 140, and the leading page of a set may be extracted based on the corresponding recoverable set number by using the table.

FIGS. 9(4a) and 9(4b) illustrate an example of the error pattern (14) detected in step S720 and show an example of the contents of the interchanged-page error notification. Specifically, FIG. 9(4a) illustrates an example in which the third page in the first set is interchanged with the 75-th page. FIG. 9(4b) shows that the set including the third page, which is an NG page, is printed as a recovery process. A command of "replace the printed material of the set including the third page with a newly printed material" may be displayed on, for example, the display device of the print recovery process module 140.

FIGS. 9(5a) and 9(5b) illustrate an example of the error pattern (15) detected in step S720 and show an example of the contents of the miscellaneous error notification (such as image distortion). Specifically, FIG. 9(5a) illustrates an example in which image distortion has occurred in the third page of the first set. FIG. 9(5b) shows that the set including the third page, which is an NG page, is printed as a recovery process. A command of "replace the printed material of the set including the third page with a newly printed material" may be displayed on, for example, the display device of the print recovery process module 140.

FIGS. 10A(1) to 10B(4) illustrate an example of a process according to this exemplary embodiment. This example shows a case where an imposition process is performed on 16 pages by using duplex printing.

The example in FIG. 10A(1) shows imposition of front and rear faces. This corresponds to a case where imposition is performed when a folding process is performed as shown in the example in FIGS. 10A(2a) to 10A(2f). Specifically, the folding process involves folding a sheet along a center line extending in the vertical direction (FIG. 10A(2a)), rotating the folded sheet clockwise by 90 degrees (FIG. 10A(2b)), folding the sheet again along a center line extending in the vertical direction (FIG. 10A(2c)), rotating the folded sheet again clockwise by 90 degrees (FIG. 10A(2d)), and folding the sheet again along a center line extending in the vertical direction (FIG. 10A(2e)), whereby a quire having first to sixteenth pages is completed (FIG. 10A(2d)).

Figure 10B:
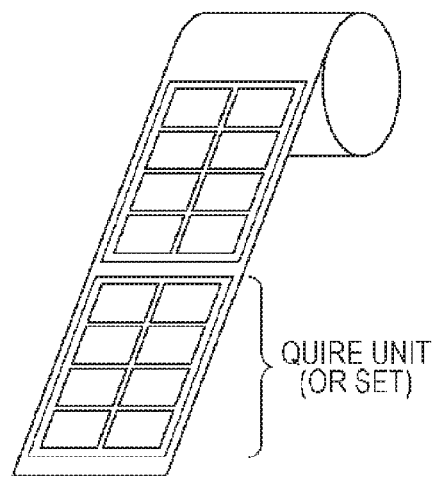
FIGS. 10A(1) to 10B(4) illustrate an example of a process according to the exemplary embodiment.

In the example shown in FIG. 10B(3), a set, which is a quire unit, has been printed on a continuous sheet, which is a printing medium (i.e., on both the front and rear surfaces thereof). When reprinting is to be performed as a recovery process after detecting a print error, a process in units of sets (quires) is performed.

In the example shown in FIG. 10B(4), sets of front faces (i.e., the upper section of FIG. 10B(4)) and rear faces (i.e., the lower section of FIG. 10(4)) are shown. Thus, when reprinting is to be performed as a recovery process after detecting a print error, a process in units of sets (quires) including both the front and rear faces is performed. In accordance with the specifications of binding, the specifications of quire and imposition are set in advance.

FIGS. 11A(11a), 11B, to 11C(52b) illustrate a control example of a method of continuing with a print job upon error detection when duplex printing is performed in units of sets. Regardless of the type of error pattern, reprinting is performed in units of sets. Printing is performed on the rear face subsequent to the front face. Therefore, when an error is detected on the front face, the rear face may be a blank page (or a dummy page) as a recovery process.

FIGS. 11A(11a) and 11A(11b) illustrate an example of the error pattern (11) detected in step S708 and show an example of the contents of the blank-paper error notification. Specifically, FIG. 11A(11a) illustrates an example in which the front face of the third page in the first set is blank. FIG. 11A(11b) shows that the set including the third page (i.e., both the front and rear faces thereof), which is an NG page, is printed as a recovery process. A command of "replace the set including the third page with a newly printed material" may be displayed on, for example, the display device of the print recovery process module 140.

FIGS. 11A(12a) and 11A(12b) illustrate an example of the error pattern (11) detected in step S708 and show an example of the contents of the blank-paper error notification. Specifically, FIG. 11A(12a) illustrates an example in which the rear face of the 16-th page in the first set is blank. FIG. 11A(12b) shows that the set including the 16-th page (i.e., both the front and rear faces thereof), which is an NG page, is printed as a recovery process. A command of "replace the set including the 16-th page with a newly printed material" may be displayed on, for example, the display device of the print recovery process module 140.

FIGS. 11A(21a) and 11A(21b) illustrate an example of the error pattern (12) detected in step S712 and show an example of the contents of the intermittent error notification. Specifically, FIG. 11A(21a) illustrates an example in which a blank page is undesirably inserted in the front face of the original sixth page in the first set (i.e., the sixth page is printed on the position of the original seventh page, the same applies hereinafter).

Then, a leading page of a set to be printed is set as a page assuming that the error-detected set is normal. For example, at a time point (i.e., a recovery point 1122) at which printing of the set including the sixth page, which is an NG page, ends, the leading page of the second set, which is the next set, is set as the 17-th page. If the recovery point 1122 is too late, the leading page of the third set, which is the next set, is set as the 33-rd page at a time point (i.e., a recovery point 1124) for printing the next set. If a leading page of a set is not set, it may be necessary to reprint all subsequent sets. In this exemplary embodiment, the number of sets to be reprinted in this recovery process (i.e., a process for resetting a leading page of a set to be printed) may be reduced.

FIG. 11A(21b) shows that the set including the original sixth page (i.e., both the front and rear faces thereof), which is an NG page, is printed as a recovery process. A command of "replace the set including the sixth page with a newly printed material" may be displayed on, for example, the display device of the print recovery process module 140.

FIG. 11A(22a) illustrates an example in which a blank page is undesirably inserted in the rear face of the original ninth page in the first set (i.e., the 11-th page is printed on the position of the original 12-th page, the same applies hereinafter).

Then, a leading page of a set to be printed is set as a page assuming that the error-detected set is normal. For example, at a time point (i.e., a recovery point 1126) at which printing of the set including the ninth page, which is an NG page, ends, the leading page of the second set, which is the next set, is set as the 17-th page. If the recovery point 1126 is too late, the leading page of the third set, which is the next set, is set as the 33-rd page at a time point (i.e., a recovery point 1128) for printing the next set. If a leading page of a set is not set, it may be necessary to reprint all subsequent sets. In this exemplary embodiment, the number of sets to be reprinted in this recovery process (i.e., a process for resetting a leading page of a set to be printed) may be reduced.

FIG. 11A(22b) shows that the set including the original ninth page (i.e., both the front and rear faces thereof), which is an NG page, is printed as a recovery process. A command of "replace the set including the ninth page with a newly printed material" may be displayed on, for example, the display device of the print recovery process module 140.

FIGS. 11B(31a) and 11B(31b) illustrate an example of the error pattern (13) detected in step S716 and show an example of the contents of the missing-page error notification. Specifically, FIG. 11B(31a) illustrates an example in which the front face of the sixth page in the first set is missing (i.e., the seventh page is printed on the position of the original sixth page, the same applies hereinafter).

Then, a leading page of a set to be printed is set as a page assuming that the error-detected set is normal. For example, at a time point (i.e., a recovery point 1132) at which printing of the set including the sixth page, which is an NG page, ends, the leading page of the second set is set as the 17-th page. If the recovery point 1132 is too late, the leading page of the third set, which is the next set, is set as the 33-rd page at a time point (i.e., a recovery point 1134) for printing the next set. If a leading page of a set is not set, it may be necessary to reprint all subsequent sets. In this exemplary embodiment, the number of sets to be reprinted in this recovery process (i.e., a process for resetting a leading page of a set to be printed) may be reduced.

FIG. 11B(31b) shows that the set including the sixth page (i.e., both the front and rear faces thereof), which is an NG page, is printed as a recovery process. A command of "replace the set including the sixth page with a newly printed material" may be displayed on, for example, the display device of the print recovery process module 140.

FIG. 11B(32a) illustrates an example in which the rear face of the eighth page in the first set is missing (i.e., the ninth page is printed on the position of the original eighth page, the same applies hereinafter).

Then, a leading page of a set to be printed is set as a page assuming that the error-detected set is normal. For example, at a time point (i.e., a recovery point 1136) at which printing of the set including the eighth page, which is an NG page, ends, the leading page of the second set is set as the 17-th page. If the recovery point 1136 is too late, the leading page of the third set, which is the next set, is set as the 33-rd page at a time point (i.e., a recovery point 1138) for printing the next set. If a leading page of a set is not set, it may be necessary to reprint all subsequent sets. In this exemplary embodiment, the number of sets to be reprinted in this recovery process (i.e., a process for resetting a leading page of a set to be printed) may be reduced.

FIG. 11B(32b) shows that the set including the eighth page (i.e., both the front and rear faces thereof), which is an NG page, is printed as a recovery process. A command of "replace the set including the eighth page with a newly printed material" may be displayed on, for example, the display device of the print recovery process module 140.

In order to perform the process for resetting a leading page of a set to be printed, a calculation module that calculates the leading page of imposed pages included in the set may be provided. The calculation module calculates the leading page of a set by using the number of pages constituting the set and a set number to be printed. When an error is detected (in the course of printing), the calculation module calculates the leading page of the set and sets the calculated leading page into the image-data reception module 110 or the print module 120. Alternatively, a table that stores therein the leading page of each set in advance may be stored within the print recovery process module 140, and the leading page of a set may be extracted based on the corresponding recoverable set number by using the table.

FIGS. 11B(41*a*) and 11B(41*b*) illustrate an example of the error pattern (14) detected in step S720 and show an example of the contents of the interchanged-page error notification. Specifically, FIG. 11B(41*a*) illustrates an example in which the front face of the third page in the first set is interchanged with the 55-th page. FIG. 11B(41*b*) shows that the set including the third page (both the front and rear faces thereof), which is an NG page, is printed as a recovery process. A command of "replace the set including the third page with a newly printed material" may be displayed on, for example, the display device of the print recovery process module 140.

Figure 11C:
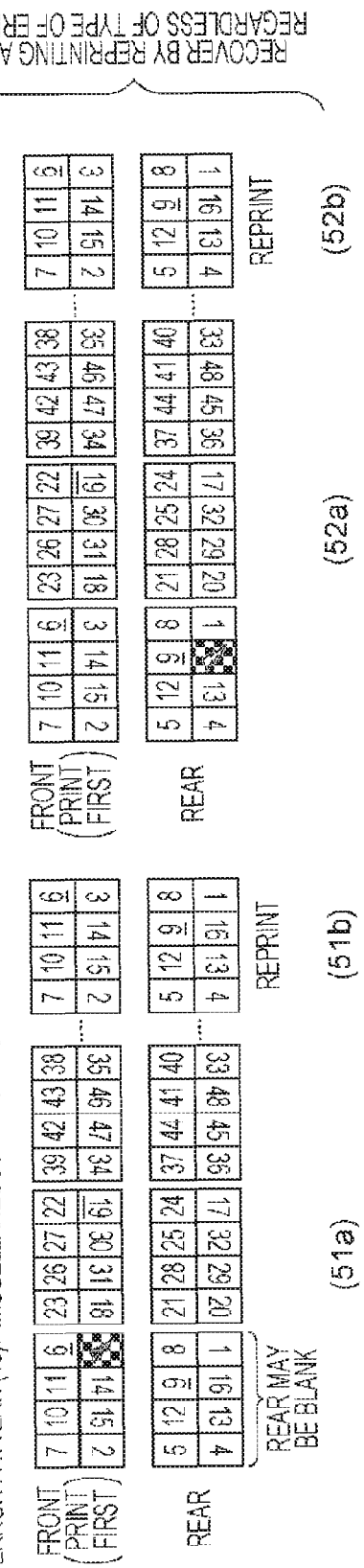
FIGS. 11A(11a), 11B, to 11C(52b) illustrate an example of a process according to the exemplary embodiment.

FIGS. 11C(42*a*) and 11C(42*b*) illustrate an example of the error pattern (14) detected in step S720 and show an example of the contents of the interchanged-page error notification. Specifically, FIG. 11C(42*a*) illustrates an example in which the rear face of the 16-th page in the first set is interchanged with the 55-th page. FIG. 11C(42*b*) shows that the set including the 16-th page (both the front and rear faces thereof), which is an NG page, is printed as a recovery process. A command of "replace the set including the 16-th page with a newly printed material" may be displayed on, for example, the display device of the print recovery process module 140.

FIGS. 11C(51*a*) and 11C(51*b*) illustrate an example of the error pattern (15) detected in step S720 and show an example of the contents of the miscellaneous error notification (such as image distortion). Specifically, FIG. 11C(51*a*) illustrates an example in which image distortion has occurred in the front face of the third page in the first set. FIG. 11C(51*b*) shows that the set including the third page (both the front and rear faces thereof), which is an NG page, is printed as a recovery process. A command of "replace the set including the third page with a newly printed material" may be displayed on, for example, the display device of the print recovery process module 140.

FIGS. 11C(52*a*) and 11C(52*b*) illustrate an example of the error pattern (15) detected in step S720 and show an example of the contents of the miscellaneous error notification (such as image distortion). Specifically, FIG. 11C(52*a*) illustrates an example in which image distortion has occurred in the rear face of the 16-th page in the first set. FIG. 11C(52*b*) shows that the set including the 16-th page (both the front and rear faces thereof), which is an NG page, is printed as a recovery process. A command of "replace the set including the 16-th page with a newly printed material" may be displayed on, for example, the display device of the print recovery process module 140.

As in the examples shown in FIGS. 11A(11*a*), 11A(21*a*), 11B(31*a*), 11B(41*a*), and 11C(51*a*), when an error is detected in the front face, the control module 175 may control the image-data reception module 110 or the print module 120 so as to print a blank page (or a dummy page) for the rear face.

Figure 12A:
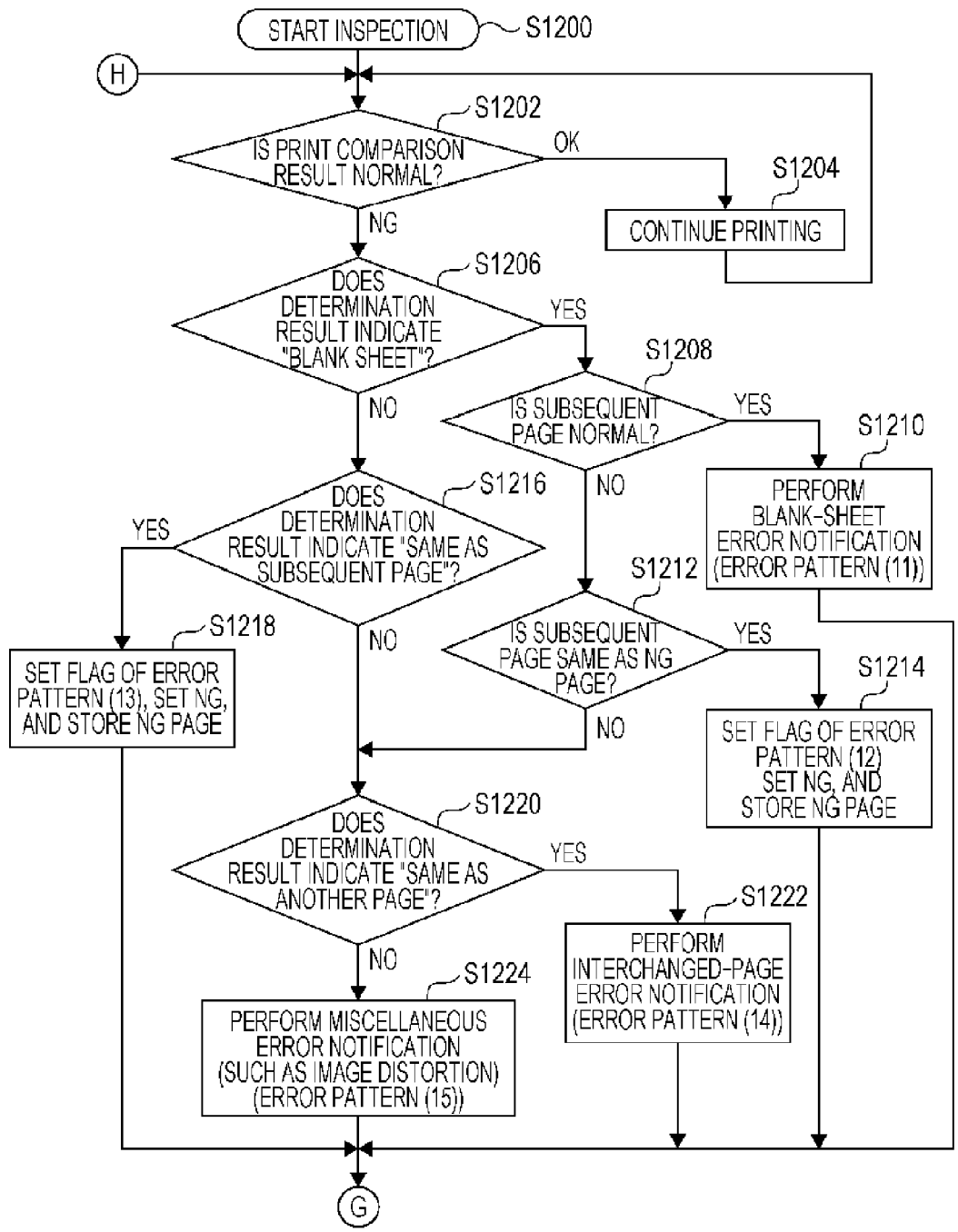

FIGS. 12A and 12B are a flowchart illustrating an example of a process according to this exemplary embodiment. In this process, an imposition process is performed on both faces, and a printing process is performed in units of sets. In this process, step S714 in the flowchart shown in the example in FIGS. 7A and 7B has been changed to step S1214, step S718 has been changed to step S1218, and step S1230 and step S1232 have been added.

In step S1200, an inspection starts.

In step S1202, it is determined whether or not a print comparison determination result is normal. If normal (OK), the process proceeds to step S1204. If not normal (NG), the process proceeds to step S1206.

In step S1204, the printing continues. Subsequently, the process returns to step S1202.

In step S1206, it is determined whether or not the determination result indicates a blank sheet. If the determination result indicates a blank sheet, the process proceeds to step S1208. Otherwise, the process proceeds to step S1216.

In step S1208, it is determined whether or not a subsequent page is normal. If normal, the process proceeds to step S1210. Otherwise, the process proceeds to step S1212.

In step S1210, a blank-sheet error notification is performed (i.e., the error pattern (11) is determined). Subsequently, the process proceeds to step S1226.

In step S1212, it is determined whether or not the subsequent page is the same as the NG page. If the subsequent page is the same as the NG page, the process proceeds to step S1214. Otherwise, the process proceeds to step S1220.

In step S1214, a flag of the error pattern (12) is set (i.e., the error pattern (12) is determined), NG is set, and the NG page is stored. Subsequently, the process proceeds to step S1226.

In step S1216, it is determined whether or not the determination result indicates "the same as subsequent page". If the determination result indicates "the same as subsequent page", the process proceeds to step S1218. Otherwise, the process proceeds to step S1220.

In step S1218, a flag of the error pattern (13) is set (i.e., the error pattern (13) is determined), NG is set, and the NG page is stored. Subsequently, the process proceeds to step S1226.

In step S1220, it is determined whether or not the determination result indicates "the same as another page". If the determination result indicates "the same as another page", the process proceeds to step S1222. Otherwise, the process proceeds to step S1224.

In step S1222, an interchanged-page error notification is performed (i.e., the error pattern (14) is determined). Then, the process proceeds to step S1226.

In step S1224, a miscellaneous error notification (such as image distortion) is performed (i.e., the error pattern (15) is determined).

In step S1226, it is determined whether or not the apparatus is set to stop printing immediately. If the apparatus is set to stop printing immediately, the process proceeds to step S1228. Otherwise, the process proceeds to step S1230.

In step S1228, the printing is stopped.

In step S1230, it is determined whether or not the flags of the error patterns (12) and (13) are set. If the flags are set, the process proceeds to step S1232. Otherwise, the process proceeds to step S1234.

In step S1232, the printing is stopped.

In step S1234, it is determined whether or not the print job has been completed. If the print job has been completed, the process proceeds to step S1238. Otherwise, the process proceeds to step S1236.

In step S1236, the printing continues. Recovery restart page calculation and setting are performed. Subsequently, the process returns to step S1202.

In step S1238, it is determined whether or not the apparatus is set to print the print-error-detected set. If the apparatus is set to print the print-error-detected set, the process proceeds to step S1240. Otherwise, the print job ends in step S1299.

In step S1240, the print-error-detected set is printed again. The error-page reprinting pattern varies depending on simplex printing or duplex printing, or an error based on any one of the error patterns (11) to (15).

In step S1299, the print job ends.

Figure 13:
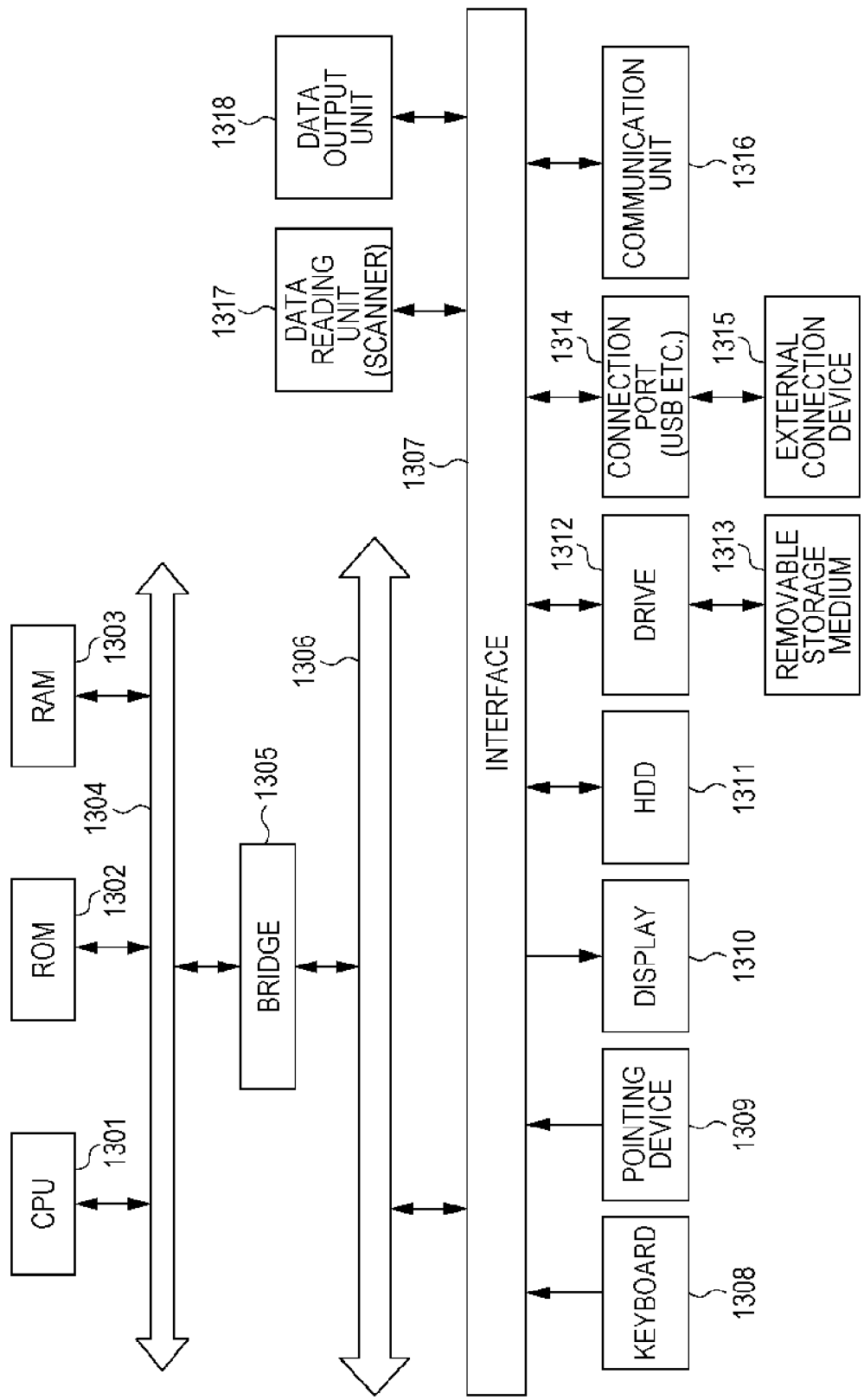
FIG. 13 is a block diagram illustrating an example of a hardware configuration of a computer that realizes the exemplary embodiment.

An example of a hardware configuration of the image processing apparatus according to this exemplary embodiment will now be described with reference to FIG. 13. The configuration shown in FIG. 13 is constituted by, for example, a personal computer (PC). The example of the hardware configuration shown includes a data reading unit 1317, such as a scanner, and a data output unit 1318, such as a printer.

A central processing unit (CPU) 1301 is a controller that executes a process in accordance with a computer program having written therein the operation sequence of the various types of modules described in the above exemplary embodiment, namely, the image-data reception module 110, the detection module 145, the recovery determination module 150, the recovery-image determination module 155, the recovery execution module 160, the print-job stop module 165, the output module 170, and so on.

A read-only memory (ROM) 1302 stores therein, for example, programs and calculation parameters used by the CPU 1301. A random access memory (RAM) 1303 stores therein, for example, programs to be used in the operation of the CPU 1301 as well as parameters that appropriately vary in the operation. The CPU 1301, the ROM 1302, and the RAM 1303 are connected to one another via a host bus 1304 constituted of, for example, a CPU bus.

The host bus 1304 is connected to an external bus 1306, such as a peripheral component interconnect/interface (PCI) bus, via a bridge 1305.

A keyboard 1308 and a pointing device 1309, such as a mouse, are input devices to be operated by an operator. A display 1310 is, for example, a liquid crystal display device or a cathode ray tube (CRT) and displays various kinds of information as text or image information.

A hard disk drive (HDD) 1311 contains a hard disk therein and drives the hard disk so as to record or reproduce information or a program to be executed by the CPU 1301. The hard disk stores therein, for example, image data from the image-data reception module 110 as well as read image data obtained by the read module 130. Moreover, the hard disk stores therein other various kinds of computer programs, such as various kinds of data processing programs.

A drive 1312 reads data or a program stored in a mounted removable storage medium 1313, such as a magnetic disk, an optical disk, a magneto-optical disk, or a semiconductor memory, and supplies the data or the program to the RAM 1303 connected thereto via an interface 1307, the external bus 1306, the bridge 1305, and the host bus 1304. The removable storage medium 1313 is also usable as a data storage area similar to the hard disk.

A connection port 1314 is a port for connecting to an external connection device 1315 and has a connection section, such as a universal serial bus (USB) or Institute of Electrical and Electronic Engineers (IEEE) 1394. The connection port 1314 is connected to, for example, the CPU 1301 via, for example, the interface 1307, the external bus 1306, the bridge 1305, and the host bus 1304. A communication unit 1316 is connected to a communication line and executes a process for data communication with the outside. The data reading unit 1317 is, for example, a scanner and executes a document reading process. The data output unit 1318 is, for example, a printer and executes a document-data output process.

The hardware configuration of the image processing apparatus shown in FIG. 13 indicates one configuration example. The exemplary embodiment is not limited to the configuration shown in FIG. 13, and an alternative configuration is permissible so long as the modules described in the exemplary embodiment are executable. For example, one or more modules may be constituted of dedicated hardware (such as an application specific integrated circuit (ASIC)), one or more modules may be located within an external system and be connected via a communication line, or multiple systems shown in FIG. 13 may be connected to each other via a communication line and operate in collaboration with each other. Furthermore, the system may be incorporated in, for example, a photocopier, a facsimile apparatus, a scanner, a printer, or a multifunction apparatus (i.e., an image processing apparatus having any two or more functions among, for example, a scanning function, a printing function, a photocopying function, and a facsimile function).

The aforementioned program may be provided by being stored in a storage medium or may be provided via a communication unit. In that case, for example, the aforementioned program may be regarded as a "computer readable storage medium storing a program".

The term "computer readable storage medium storing a program" refers to a computer readable storage medium storing a program used for, for example, installing, executing, and distributing the program.

Examples of the storage medium include a digital versatile disc (DVD), a compact disc (CD), a Blu-ray Disc (registered trademark), a magneto-optical disk (MO), a flexible disk (FD), magnetic tape, a hard disk, a read-only memory (ROM), an electrically erasable programmable read-only memory (EEPROM (registered trademark)), a flash memory, a random access memory (RAM), and a secure digital (SD) memory card. Examples of a DVD include a DVD-R, a DVD-RW, and a DVD-RAM, which are standards developed by DVD Forum, and a DVD+R and a DVD+RW, which are standards developed by DVD+RW Alliance. Examples of a CD include a compact disc read-only memory (CD-ROM), a compact disc recordable (CD-R), and a compact disc rewritable (CD-RW).

The aforementioned program or a part thereof may be stored in the storage medium for distribution or storage. Furthermore, the aforementioned program or a part thereof may be transmitted via a transmission medium, such as a wired network, a wireless network, or a combination of these networks, or may be transferred via a carrier wave. Examples of a wired network include a local area network (LAN), a metropolitan area network (MAN), a wide area network (WAN), the Internet, an intranet, and an extranet.

Furthermore, the aforementioned program may be a part of another program, or may be stored in a storage medium together with a different program. Moreover, the aforementioned program may be stored in segments in multiple storage media. The aforementioned program may be stored in any state, such as a compressed state or an encrypted state, so long as the program is recoverable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to execute:
    a detection unit configured to detect an error by comparing image data related to a print job with read image data obtained as a result of reading a print output related to the print job; and
    a recovery determination unit configured to compare read image data related to a post-error print output, which is a continuously-printed print output related to the print job for a page subsequent to a page in which the error is detected, with the image data when the error is detected by the detection unit, so as to determine whether or not the print job is recoverable and a process for recovering the print job by using the post-error print output,
wherein, in response to determining that the print job is recoverable, the image processing apparatus performs the process for recovering the print job using the post-error print out, and
wherein the processor is configured to further execute:
    a recovery-image-data determination unit configured to determine recovery image data used for recovery in addition to the post-error print output if the recovery determination unit determines that the print job is recoverable; and
    a recovery execution unit configured to execute a recovery print job, which uses the recovery image data determined by the recovery-image-data determination unit, upon completion of a current print output.

2. The image processing apparatus according to claim 1, wherein the processor is configured to further execute:
a print-job stop unit configured to stop the print job if the recovery determination unit determines that the print job is not recoverable.

3. The image processing apparatus according to claim 1, wherein the recovery-image-data determination unit is configured to set image data of the page subsequent to the page in which the error is detected as the recovery image data, and
wherein the recovery execution unit is configured to execute the recovery print job when stoppage of the print job is cancelled.

4. The image processing apparatus according to claim 1, wherein the processor is configured to further execute:
an output unit is configured to output information related to recovery of a print job.

5. The image processing apparatus according to claim 1, wherein the detection unit is configured to detect the error by comparing a density histogram of the image data calculated for respective predetermined multiple regions with a density histogram of the read image data.

6. A non-transitory computer readable medium storing a program causing a computer to execute an image processing process, the image processing process comprising:
detecting an error by comparing image data related to a print job with read image data obtained as a result of reading a print output related to the print job;
comparing read image data related to a post-error print output, which is a continuously-printed print output related to the print job for a page subsequent to a page in which the error is detected, with the image data when the error is detected, so as to determine whether or not the print job is recoverable and a process for recovering the print job by using the post-error print output;
performing, in response to determining that the print job is recoverable, the process for recovering the print job using the post-error print out;
determining recovery image data used for recovery in addition to the post-error print output if the print job is determined to be recoverable; and
executing a recovery print job by using the recovery image data, upon completion of a current print output.

7. An image processing method comprising:
detecting an error by comparing image data related to a print job with read image data obtained as a result of reading a print output related to the print job;
comparing read image data related to a post-error print output, which is a continuously-printed print output related to the print job for a page subsequent to a page in which the error is detected, with the image data when the error is detected, so as to determine whether or not the print job is recoverable and a process for recovering the print job by using the post-error print output;
performing, in response to determining that the print job is recoverable, the process for recovering the print job using the post-error print out;
determining recovery image data used for recovery in addition to the post-error print output if the print job is determined to be recoverable; and
executing a recovery print job by using the recovery image data, upon completion of a current print output.

8. The non-transitory computer readable medium according to claim 6, wherein the image processing process further comprises:
stopping the print job in response to determining that the print job is not recoverable.

9. The image processing method according to claim 7, further comprising stopping the print job in response to determining that the print job is not recoverable.

* * * * *